(12) United States Patent
Hull et al.

(10) Patent No.: US 7,057,106 B2
(45) Date of Patent: Jun. 6, 2006

(54) MUD BOX AND ADAPTERS

(75) Inventors: Eric G. Hull, Madison, OH (US); Charles H. Riedy, Lakewood, OH (US); Robert M. Gudin, Willoughby, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 0 days.

(21) Appl. No.: 11/152,935

(22) Filed: Jun. 15, 2005

(65) Prior Publication Data

US 2005/0230136 A1   Oct. 20, 2005

Related U.S. Application Data

(62) Division of application No. 10/680,637, filed on Oct. 7, 2003.

(51) Int. Cl.
 *H02G 3/08* (2006.01)
(52) U.S. Cl. ............................. 174/50; 174/53; 174/58; 220/3.2; 220/3.8; 248/906
(58) Field of Classification Search .................. 174/50, 174/48, 53, 57, 58, 68.1, 60, 59, 65 R; 220/3.2, 220/3.3, 3.4, 3.5, 3.6, 3.7, 3.8, 3.9, 4.02; 248/906; 439/535, 536
See application file for complete search history.

(56) References Cited

U.S. PATENT DOCUMENTS

| | | | |
|---|---|---|---|
| 593,841 A | * | 11/1897 | Greenfield ................. 220/3.2 |
| 3,927,249 A | * | 12/1975 | Pearse ......................... 174/53 |
| 4,620,061 A | | 10/1986 | Appleton |
| 4,936,478 A | | 6/1990 | Bozdeck |
| 4,959,506 A | | 9/1990 | Petty et al. |
| 5,192,831 A | | 3/1993 | Yang |
| 5,679,924 A | | 10/1997 | Young et al. |
| 5,783,774 A | | 7/1998 | Bowman et al. |
| 6,274,809 B1 | | 8/2001 | Pudims et al. |
| 6,521,833 B1 | | 2/2003 | DeFreitas |
| 6,733,345 B1 | | 5/2004 | Weise et al. |
| 6,774,307 B1 | | 8/2004 | Kruse et al. |
| 6,831,227 B1 | | 12/2004 | Weise et al. |

* cited by examiner

*Primary Examiner*—Dean A. Reichard
*Assistant Examiner*—Angel R. Estrada
(74) *Attorney, Agent, or Firm*—Jones Day

(57) ABSTRACT

A square electrical box molded in one-piece of plastic material has three ENT connectors extending outwardly from each box sidewall. The connectors on each sidewall include a middle connector and two outer connectors. All of the middle connectors are sized for receiving one-half inch standard trade size ENT conduit. Both of the outer connectors one one pair of opposite sidewalls are sized for receiving three-quarter inch standard trade size ENT conduit. The other pair of opposite sidewalls have one outer connector sized to receive three-quarter inch standard trade size ENT conduit and another outer connector sized to receive one-inch standard trade size ENT conduit. The box has attachment ears extending outwardly from the box corners along diagonal lines that extend across diagonally opposite ones of the box corners. An adapter attached to a front surface of the box has attachment ears aligned with the box ears. Fastener receiving holes through the attachment ears are configured to receive fasteners that are inwardly inclined toward the box central longitudinal axis.

15 Claims, 25 Drawing Sheets

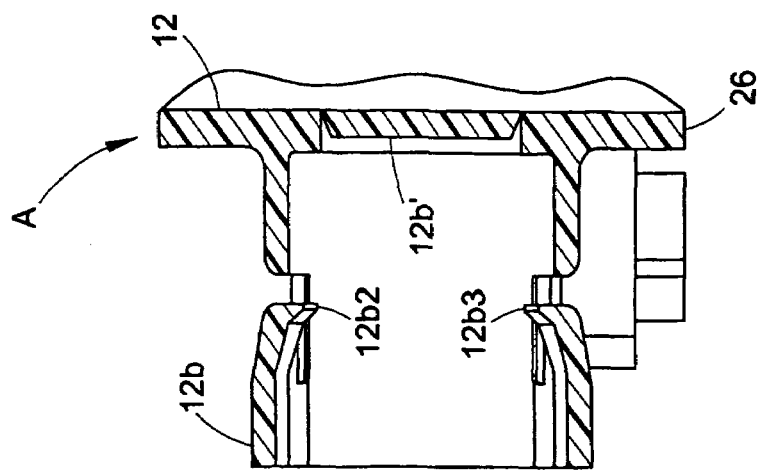
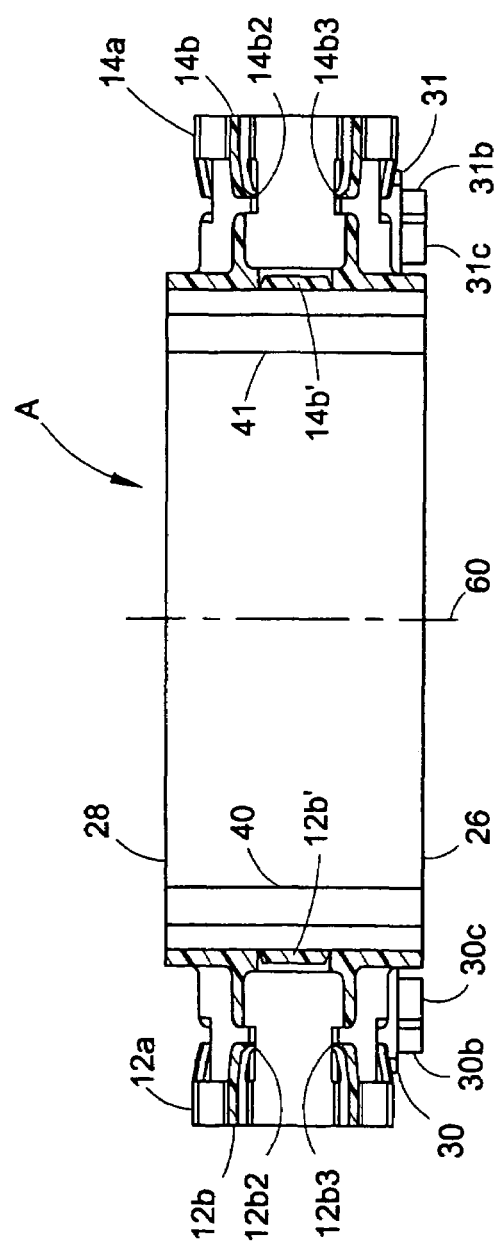

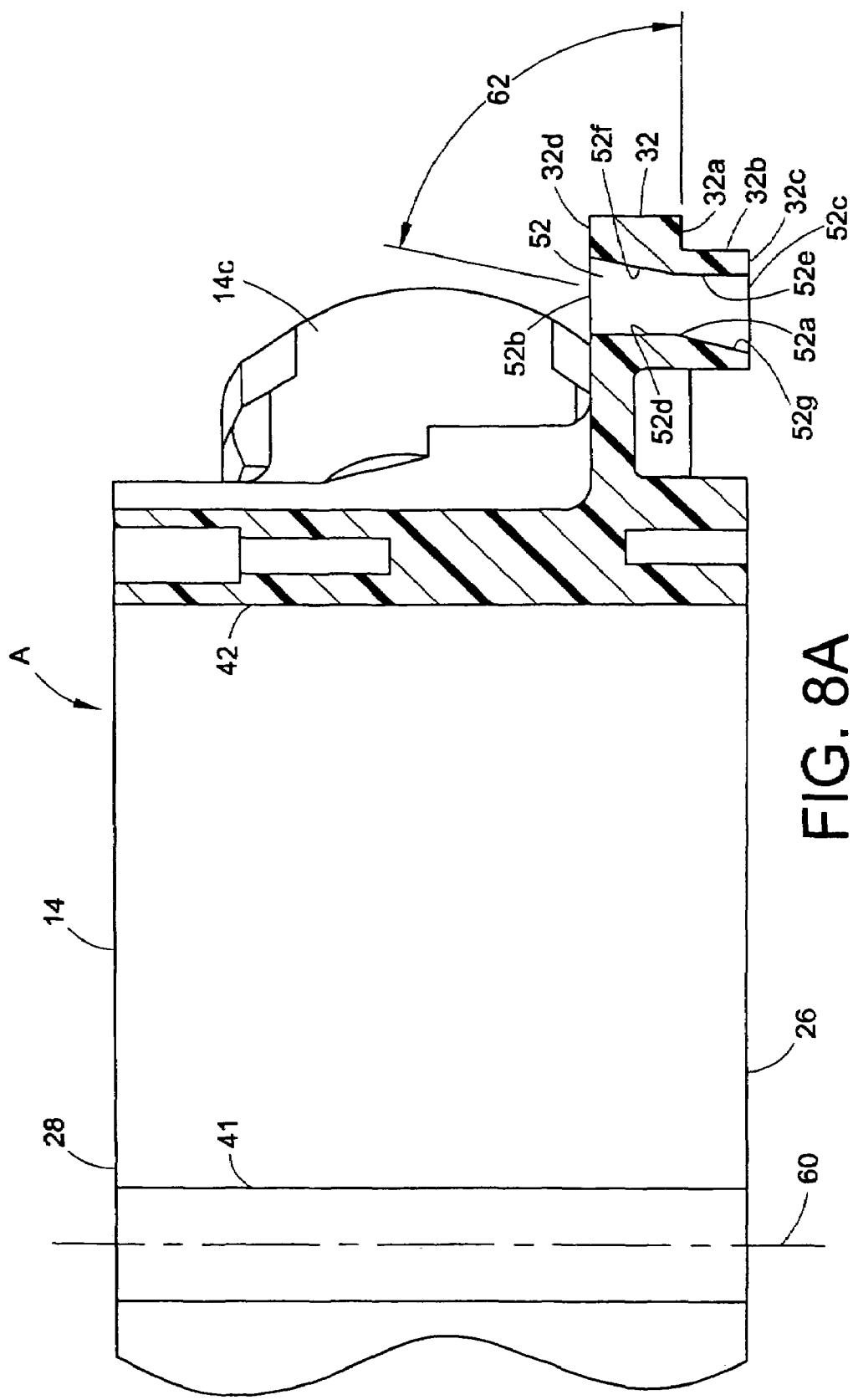

MUD BOX AND ADAPTERS

REFERENCE TO RELATED APPLICATION

This application is a division of U.S. Ser. No. 10/680,637 filed Oct. 7, 2003.

BACKGROUND OF THE INVENTION

This application relates to the art of electrical boxes and, more particularly, to electrical boxes that are known as mud boxes or slab boxes for use in poured concrete construction. Although the subject matter of the application will be shown and described with specific reference to mud boxes, it will be appreciated that the application subject matter has broader aspects, and that features thereof may be used for other purposes and in other environments.

Mud boxes typically are attached to a surface of a concrete form on which concrete subsequently is poured. The box is embedded within the concrete structure and a box front opening is exposed at the surface of the concrete structure when the forms are removed. Different types of adapters are used with mud boxes such as ceiling adapters, two gang four square adapters and single gang four square adapters. It is desirable to have mud boxes and adapters that are compatible with one another and easy to work with in the field.

SUMMARY OF THE INVENTION

In accordance with the present application, a square mud box is molded in one piece of plastic material. Each sidewall of the box has three integral ENT connectors extending outwardly therefrom including a middle connector and two outer connectors. The middle connector on each sidewall has a socket therein sized for receiving one-half inch standard trade size ENT conduit. The outer connectors on two opposite sidewalls of the box have sockets sized for receiving three-quarter inch standard trade size ENT conduit. On the other pair of opposite sidewalls, one outer connector is sized for receiving three-quarter inch standard trade size ENT conduit while the other outer connector has a socket sized for receiving one-inch standard trade size ENT conduit.

A square mud box in accordance with the present application has attachment ears extending outwardly from the corners thereof along diagonal lines that extend across diagonally opposite corners of the box. The attachment ears are located closely adjacent the front surface of the box and the external box corners are concavely curved between the box rear surface and the attachment ears.

The internal corners of the box have bosses extending the full height of the box between its front and rear surfaces, and fastener receiving openings in the bosses open outwardly at the box front and rear surfaces.

Fastener receiving holes in the box attachment ears are configured for receiving fasteners that extend either parallel to the box central longitudinal axis or that are inclined inwardly toward the box central longitudinal axis.

A ceiling adapter, a two gang four square adapter or a single gang four square adapter are attachable to the box front surface. The adapters have adapter attachment ears aligned with the box attachment ears. The adapter attachment ears have fastener receiving holes that are aligned with the fastener receiving holes in the box attachment ears. On at least some adapters, the fastener receiving holes in the adapter attachment ears also are inclined inwardly toward the adapter longitudinal axis. The fasteners that attach a box and adapter to a concrete form are severed at the concrete surface when the forms are removed. Inward inclination of the fasteners locates the exposed severed fasteners on the concrete surface closer inwardly toward the longitudinal axis of the adapter so that the severed ends are more easily covered with an escutcheon. Inclination of the fasteners also provides enhanced holding strength.

The adapter fastener ears preferably have front surfaces that are spaced rearwardly from the adapter front surface. This raises the attachment ears off from a surface to which the box is attached, and facilitates hammering or otherwise driving fasteners into a concrete form through the fastener receiving holes in the attachment ears.

It is a principal object of the present invention to provide an improved mud box.

It is also an object of the invention to provide a mud box that is adaptable for receiving many different standard sizes of components.

It is a further object of the invention to provide an improved mud box and adapter assembly.

BRIEF DESCRIPTION OF THE DRAWING

FIG. 6 is a cross-sectional elevational view taken generally on line 6—6 of FIG. 2;

FIG. 7 is an enlarged cross-sectional elevational view of a connector;

FIG. 8a is an enlarged partial cross-sectional elevational view similar to FIG. 8 and showing an attachment hole through a box attachment ear.

DESCRIPTION OF REPRESENTATIVE EMBODIMENTS

Figure 1:
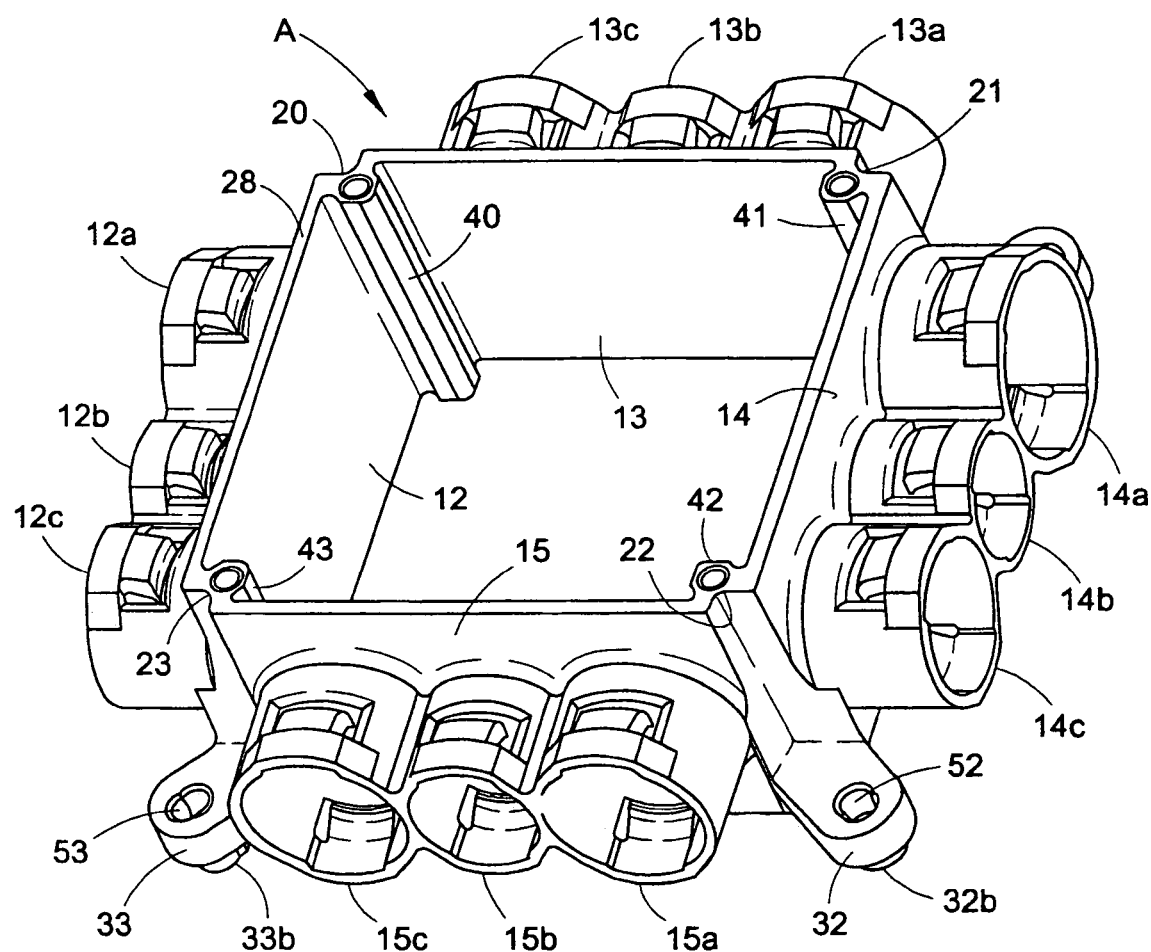
FIG. 1 is a perspective illustration of a mud box in accordance with present application.

Referring now to the drawing, wherein the showings are for purposes of illustrating certain representative embodiments of the application subject matter and not for purposes of limiting same, FIG. 1 shows a square electrical box A molded in one-piece of plastic material. Box A has four sidewalls 12, 13, 14 and 15 extending perpendicular to one another and intersecting at corners 20, 21, 22 and 23. Box A has plane peripheral front and rear surfaces 26, 28 that lie in parallel planes. The box is open at the front and rear thereof.

Each sidewall 12–15 has three connectors molded integrally therewith and extending outwardly therefrom. The connectors are of the type for receiving electrical nonmetallic tubing that is known as ENT tubing or ENT conduit. The connectors commonly are known as ENT connectors.

Sidewall 12 has outer connectors 12a and 12c, and a middle connector 12b. Sidewall 13 has outer connectors 13a and 13c, and a middle connector 13b. Sidewall 14 has opposite outer connectors 14a and 14c, and a middle connector 14b. Sidewall 15 has opposite outer connectors 15a and 15c, and a middle connector 15b.

All of middle connectors 12, b, 13b, 14b and 15b have sockets therein that are sized for receiving standard trade size one-half inch ENT conduit. Each outer connector 13a, 13c, 15a and 15c has a socket therein sized for receiving standard trade size three-quarter inch ENT conduit. Each connector 12a and 14a has a socket therein sized for receiving standard trade size one-inch ENT conduit. Each connector 12c and 14c has a socket therein sized for receiving standard trade size three-quarter inch ENT conduit. The middle and outer connectors on each sidewall share a common peripheral wall as shown in FIGS. 4 and 5.

Figure 4:
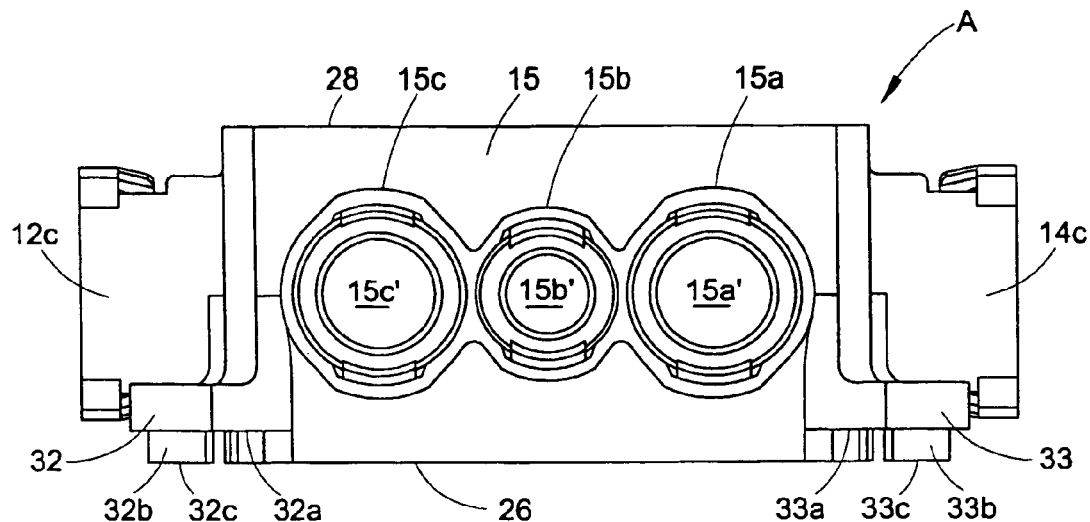
FIG. 4 is a side elevational view of one side thereof, the opposite side being a mirror image thereof.
Figure 5:
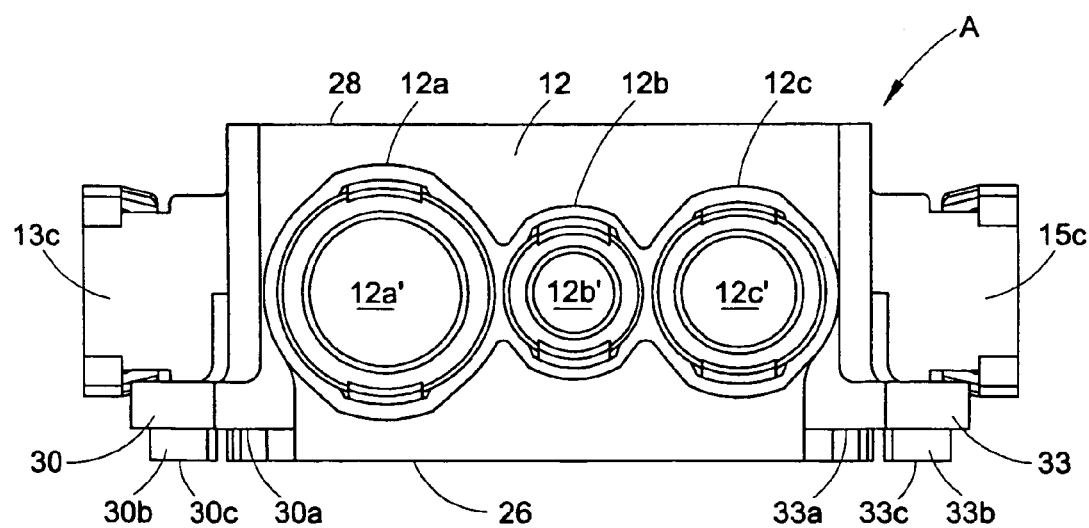
FIG. 5 is a side elevational view of another side that extends perpendicular to the side of FIG. 4, the opposite side being a mirror image thereof.

At the bottom of the socket in each connector, the exterior surface of each sidewall has a circular groove formed therein to provide removable knockouts as indicated in FIG. 4 at 15a', 15b' and 15c', and in FIG. 5 at 12a', 12b' and 12c'. Each connector has opposite resilient toothed fingers extending generally radially into the socket therein for reception of the inwardly extending finger end in an external annular groove in corrugated ENT conduit. Two of such opposite toothed fingers are generally indicated in FIG. 7 for connector 12b at 12b2 and 12b3. Such fingers are also generally indicated in FIG. 6 at 14b2 and 14b3 for connector 14b.

Figure 2:
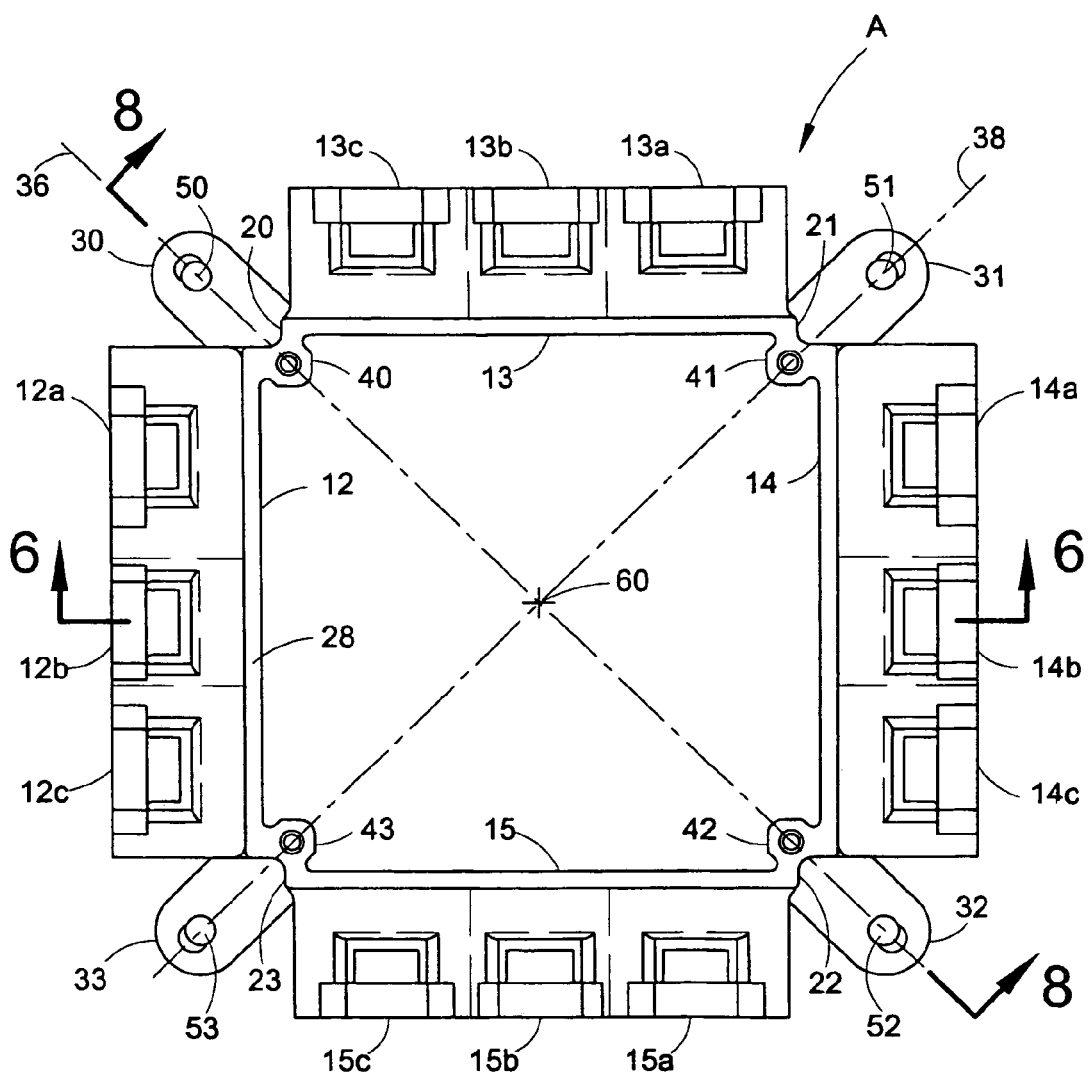
FIG. 2 is a top plan view thereof.
Figure 3:
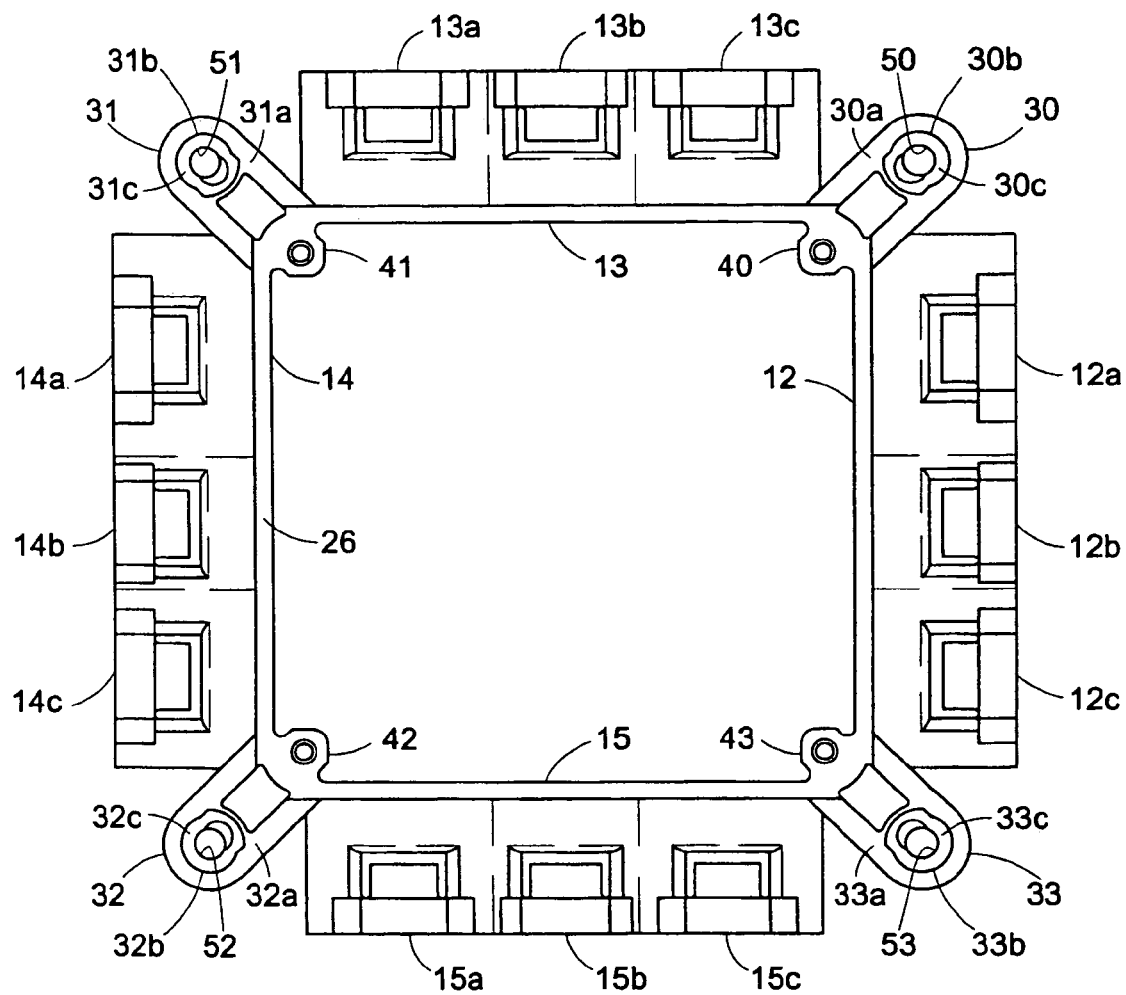
FIG. 3 is a bottom view thereof.

As best shown in FIGS. 2 and 3, attachment ears 30, 31, 32 and 33 extend outwardly from box corners 20–23. Attachment ears 30 and 32 extend outwardly along and are centered on a diagonal line 36 that extends across diagonally opposite box corners 20 and 22. Attachment ears 31 and 33 extend outwardly along and are centered on a diagonal line 38 that extends across diagonally opposite box corners 21 and 23.

As shown in FIGS. 4 and 5, attachment ears 30–33 are positioned closely adjacent box front surface 26. Each attachment ear has a plane ear front surface 30a, 31a, 32a and 33a that is spaced rearwardly from box surface 26. The outer end portion of each attachment ear 30–33 has a relatively small extension 30b, 31b, 32b and 33b extending therefrom and terminating in a flat surface 30c, 31c, 32c and 33c that lies in a common plane with box front surface 26. Extensions 30b–33b have outer peripheries spaced inwardly from the outer peripheries of attachment ears 30–33 and leave a very small footprint in a finished concrete surface when they are positioned against a concrete form.

As best shown in FIGS. 1 and 2, the exterior corners 20–23 of box A are inwardly concave from box rear surface 28 to attachment ears 30–33. The concave corners extend over a major height of the box between front and rear surfaces 26 and 28 thereof. The interior corners of box A have inwardly extending bosses 40–43 molded therein and extending the full height of box A between front and rear surfaces 26, 28 thereof. The opposite ends of bosses 40–43 have fastener receiving holes therein that open outwardly at both front and rear surfaces 26, 28 of box A.

Each box attachment ear 30–33 has a fastener receiving hole therethrough 50, 51, 52 and 53. The fastener receiving holes extend in a direction between box rear surface 28 and box front surface 26. The fastener receiving holes are configured for receiving nails or screws that extend either parallel to box central longitudinal axis 60 or are inclined inwardly toward such axis so that the extended axis of the fastener intersects the box central longitudinal axis.

Figure 8:
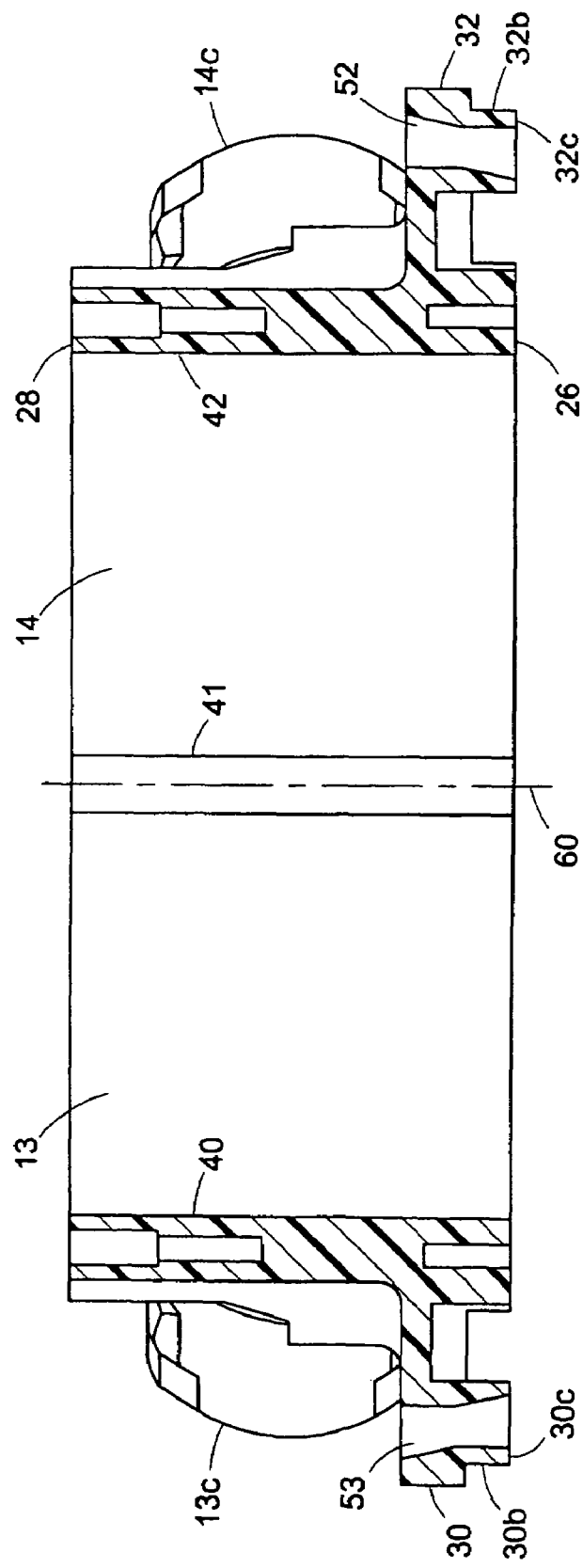
FIG. 8 is a cross-sectional elevational view taken generally on line 8—8 of FIG. 2.
Figure 9:
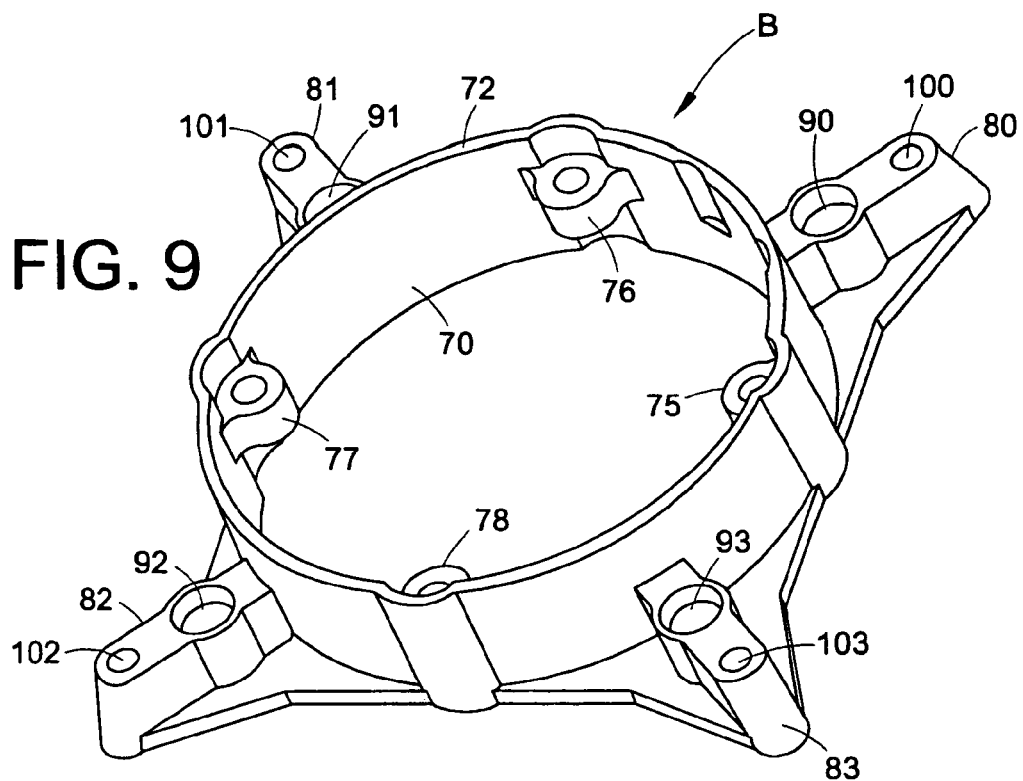
FIG. 9 is a perspective illustration of a ceiling adapter.
Figure 10:
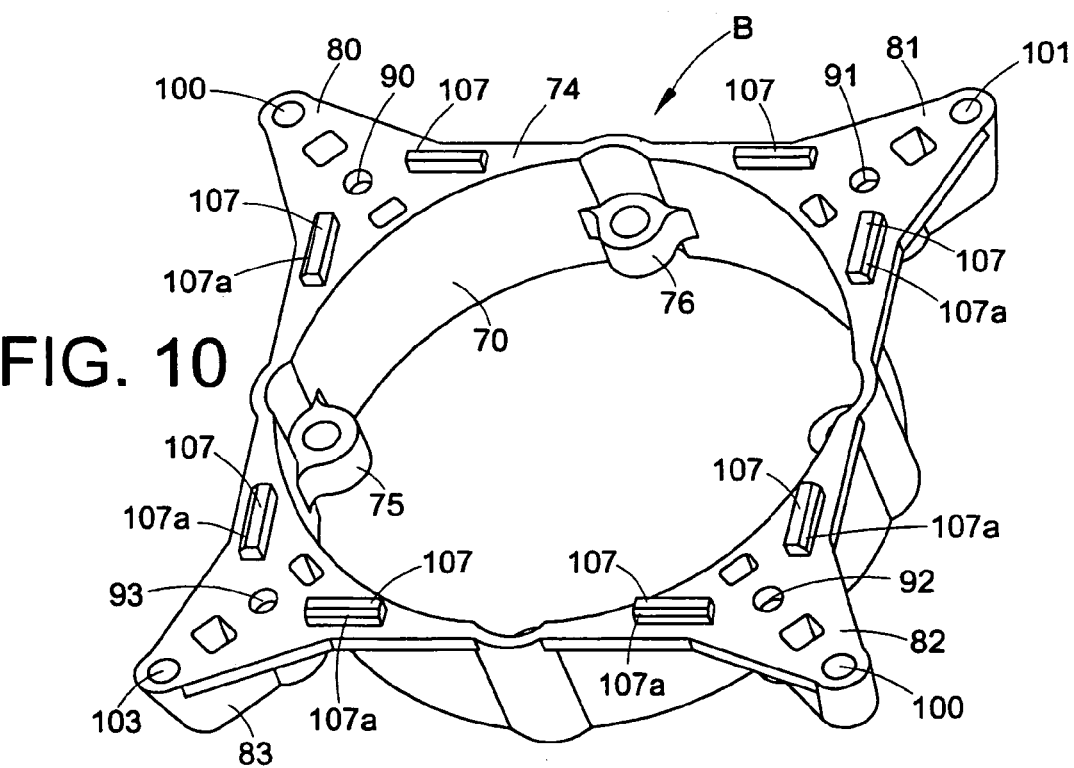
FIG. 10 is another perspective illustration of the ceiling adapter.
Figure 11:
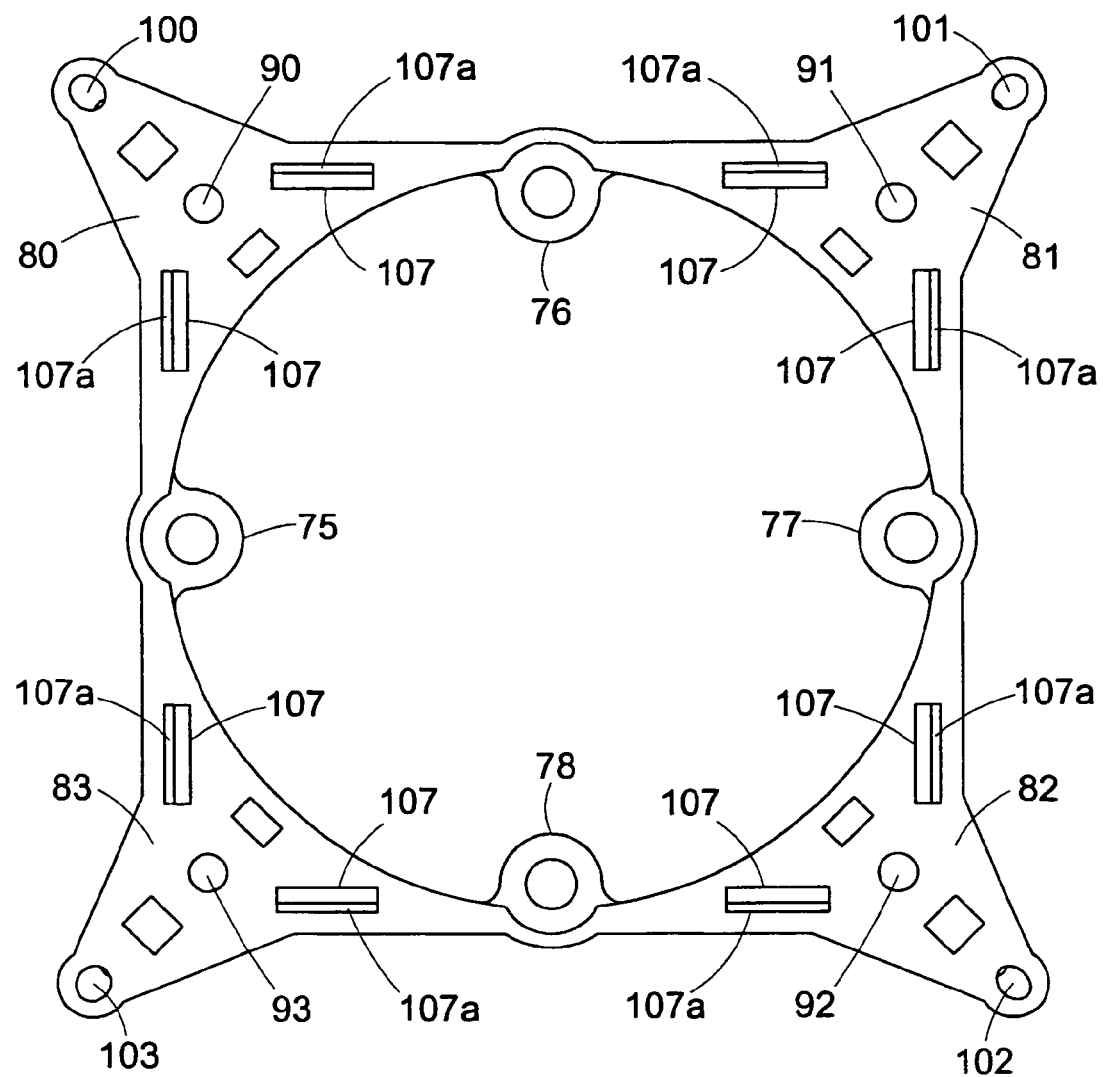
FIG. 11 is a rear view of the ceiling adapter.
Figure 12:
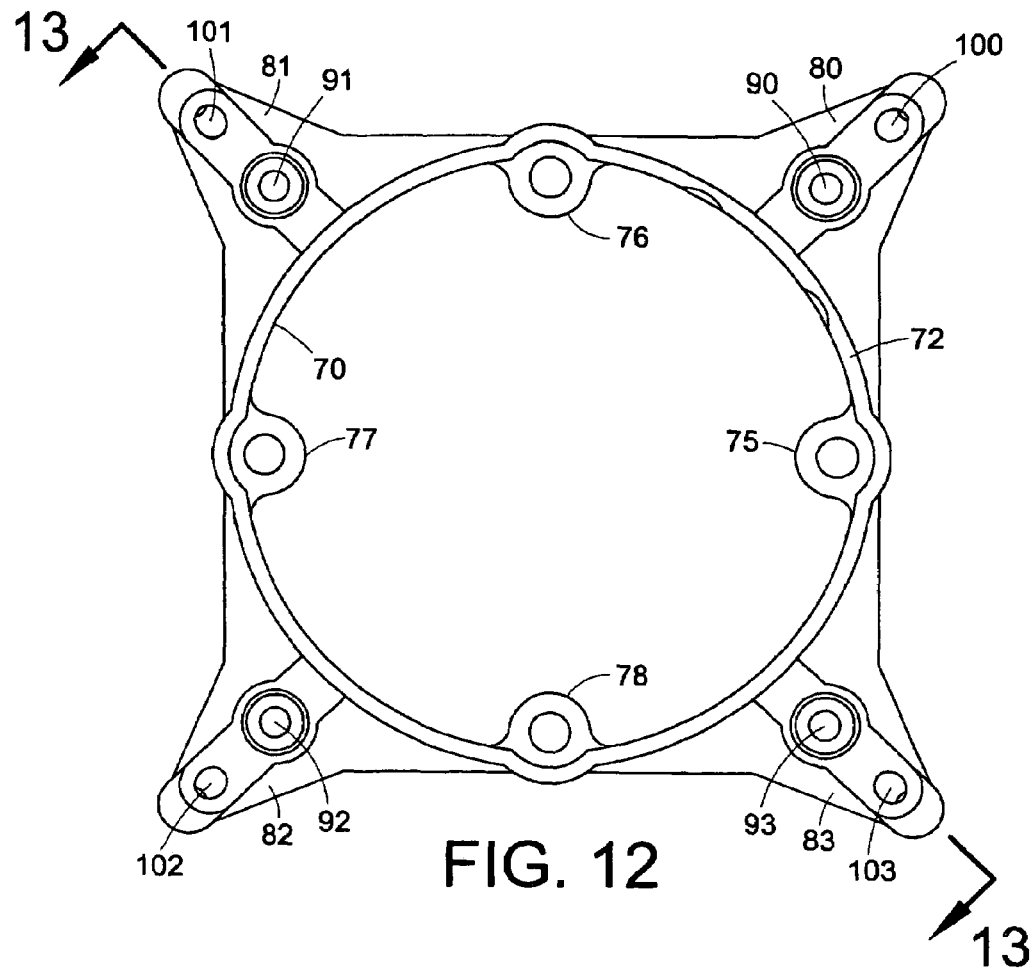
FIG. 12 is a front view of the ceiling adapter.

Referring to FIG. 8A, fastener receiving hole 52 has a circular portion 52a midway between ear extension front surface 32c and attachment ear rear surface 32d. Entrance opening 52b and exit opening 52c are oblong in a direction along diagonal line 36 of FIG. 2 that extends across diagonally opposite box corners 20, 22. Hole 52 has cylindrical surface portions 52d and 52e that extend parallel to box central longitudinal axis 60. Surfaces 52d, 52e lie on the periphery of circular portion 52a. A fastener that is dimensioned for close reception through circular portion 52a may be extended vertically through hole 52 parallel to box axis 60 into a concrete form or the like. The periphery of circular central portion 52a along with hole cylindrical surface portions 52d and 52e will engage the outer surface of the fastener to secure box A against movement in any direction.

Hole 52 has curved inclined surfaces 52f, 52g opposite from surfaces 52d, 52e. Surfaces 52f, 52g are inclined to the plane of box front surface 26 at an angle 62 of around 75°. Thus, the inclination of surfaces 52f, 52g is around 15° outwardly from box longitudinal axis 60. A fastener may be inserted through hole 52 in engagement with inclined surfaces 52f, 52g, and an imaginary extension of the fastener axis will intersect with box longitudinal axis 60. This arrangement locates the fastener closer to box longitudinal axis 60 compared to a fastener that is extended through hole 52 parallel to axis 60. When the concrete form is removed, the fasteners are severed at the concrete surface. Locating the fasteners closer to the outer periphery of the box permits covering the severed ends of the fasteners at the concrete surface with an escutcheon plate that is attached to the box.

FIGS. 9–13 show a ceiling adapter that is attachable to front surface 26 of box A. Ceiling adapter B has a generally cylindrical peripheral wall 70 with an adapter front surface 72 in FIG. 9 and an adapter rear surface 74 in FIG. 10. Circumferentially-spaced internal bosses 75, 76, 77 and 78 have fastener receiving holes therein for attaching a fixture or the like to adapter B.

Adapter attachment ears 80, 81, 82 and 83 extend outwardly from adapter peripheral wall 70 along diagonal lines that extend across diagonally opposite corners of a square. Adapter attachment ears 80–83 have countersunk fastener receiving holes 90, 91, 92 and 93 that are alignable with the fastener receiving holes in bosses 40–43 at the internal corners of box A.

Adapter attachment ears 80–83 have fastener receiving holes 100, 101, 102 and 103 therethrough. The entrance openings to fastener receiving holes 100–103 on adapter rear surface 74 are alignable with the exit openings of fastener receiving holes 50–53 in box attachment ears 30–33. For example, the entrance opening to hole 102 in adapter attachment ear 82 would be aligned with exit opening 52c for hole 52 in box attachment ear 32. Fastener receiving holes 100–103 in adapter attachment ears 80–83 are inclined to the plane of adapter front surface 72 at angles of around 75° as indicated at 108 for hole 103 in FIG. 13. The inclination is such that imaginary extensions of the axes of fasteners received through inclined holes 100–103 will intersect adapter longitudinal axis 109. This positions the fasteners much closer to the outer periphery of adapter peripheral wall 70 and front surface 72 thereof. Fasteners that are severed at the surface of a concrete ceiling then will be located much closer to peripheral wall 70 so that they can be covered with an escutcheon plate that is attached to adapter B.

Figure 13:
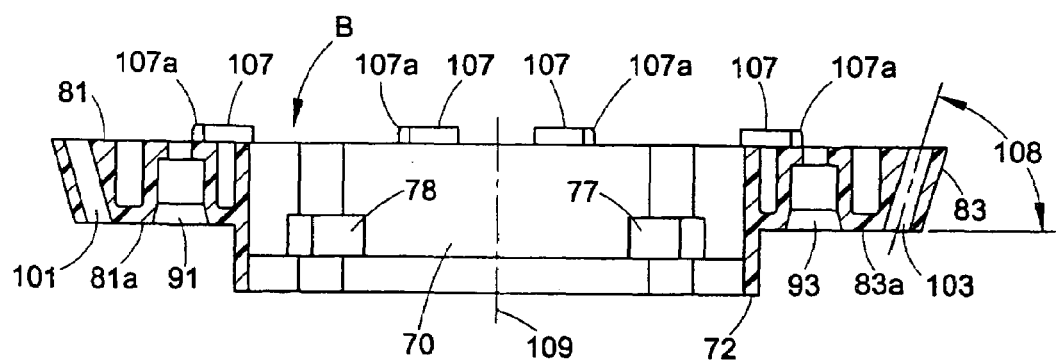
FIG. 13 is a cross-sectional elevational view taken generally on line 13—13 of FIG. 12.
Figure 14:
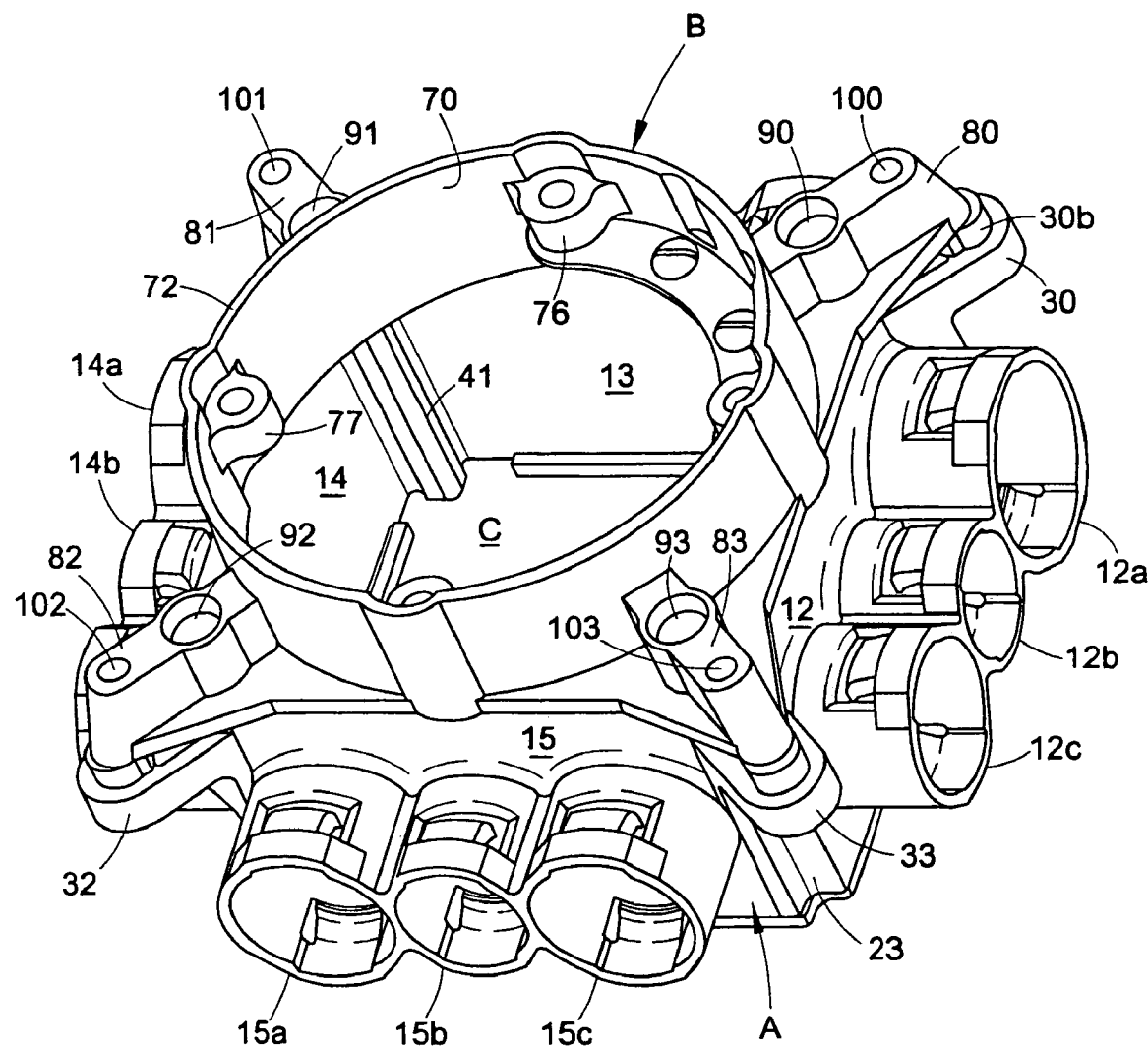
FIG. 14 is a perspective illustration of the ceiling adapter of FIGS. 9–13 installed on the box of FIGS. 1–8.
Figure 15:
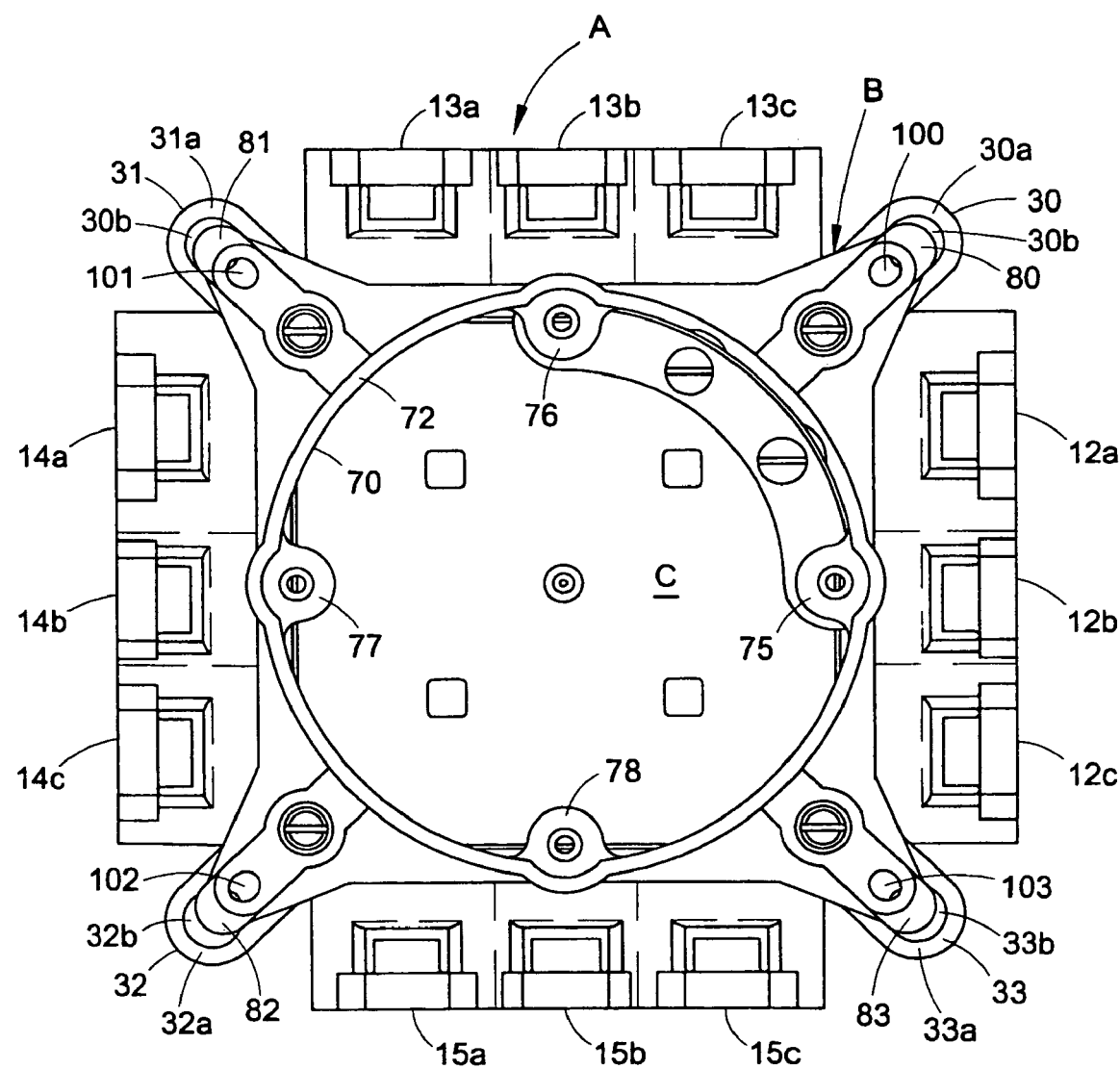
FIG. 15 is a front elevational view thereof.
Figure 16:
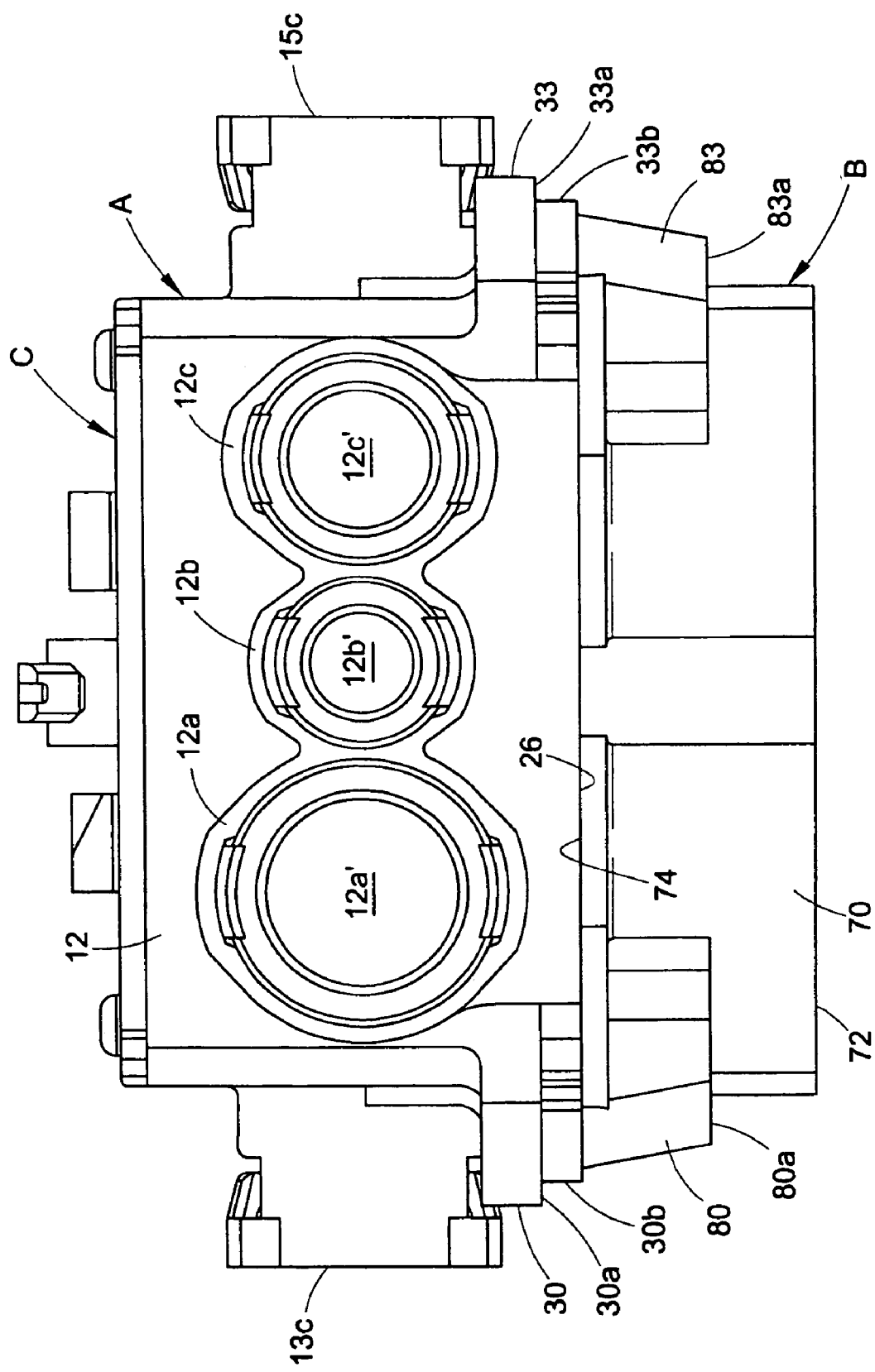
FIG. 16 is a side elevational view thereof, the opposite side being a mirror image thereof.
Figure 17:
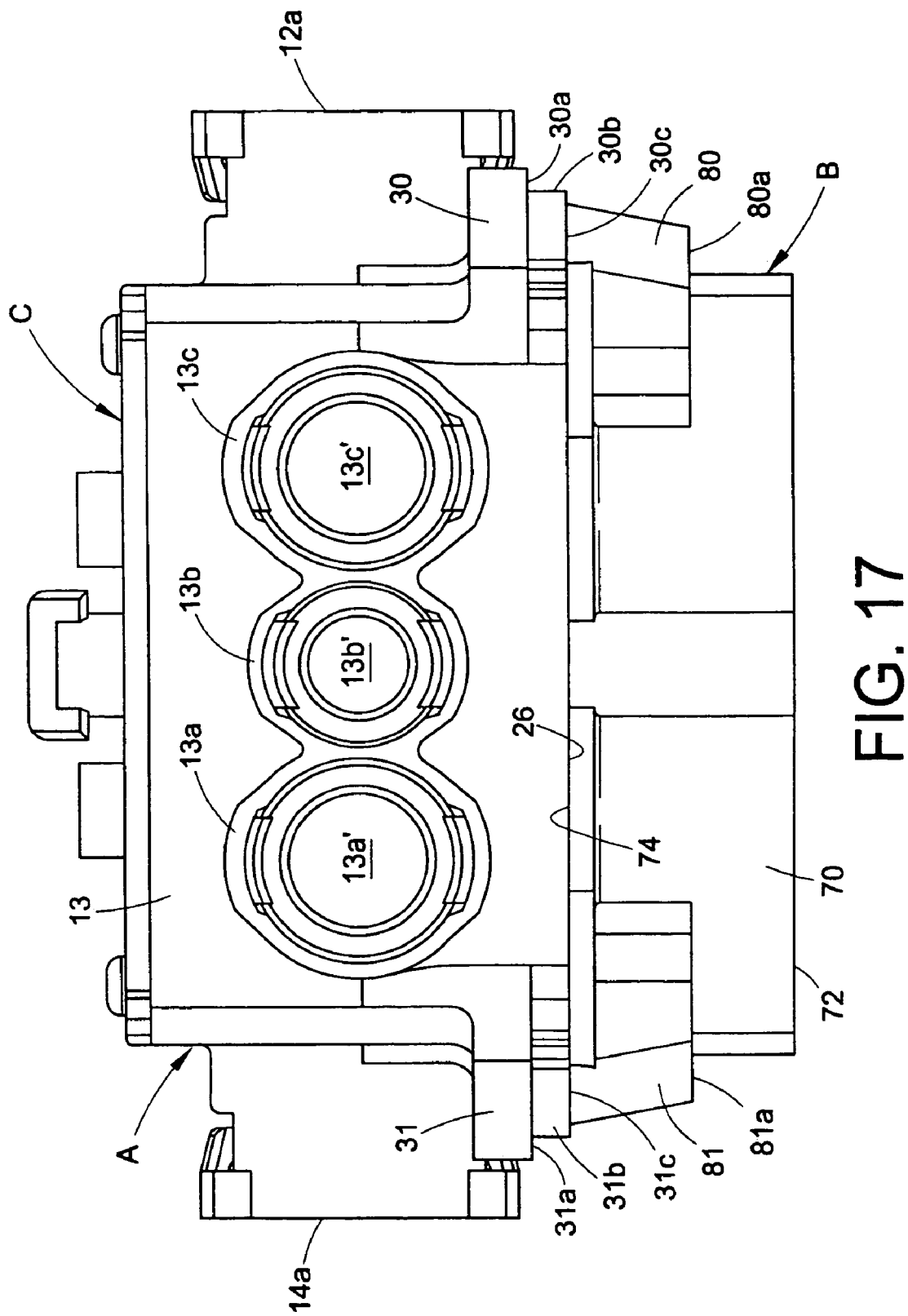
FIG. 17 is a side elevational view of another side thereof, the opposite side being a mirror image thereof.
Figure 18:
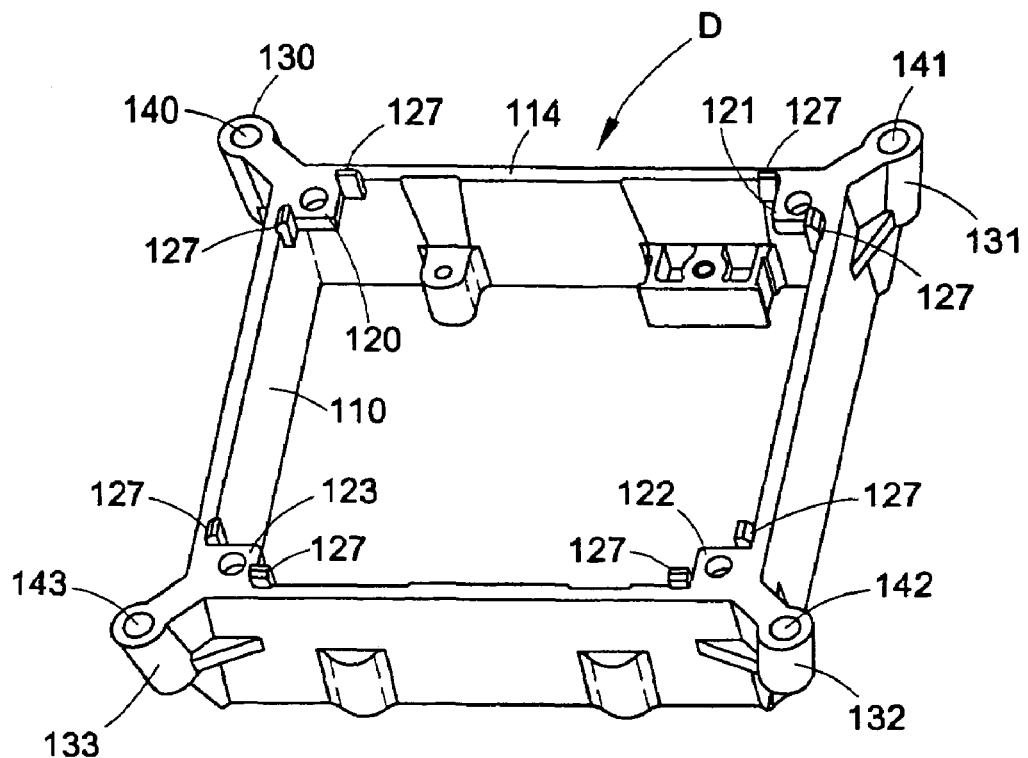
FIG. 18 is a perspective illustration of a two gang adapter.
Figure 19:
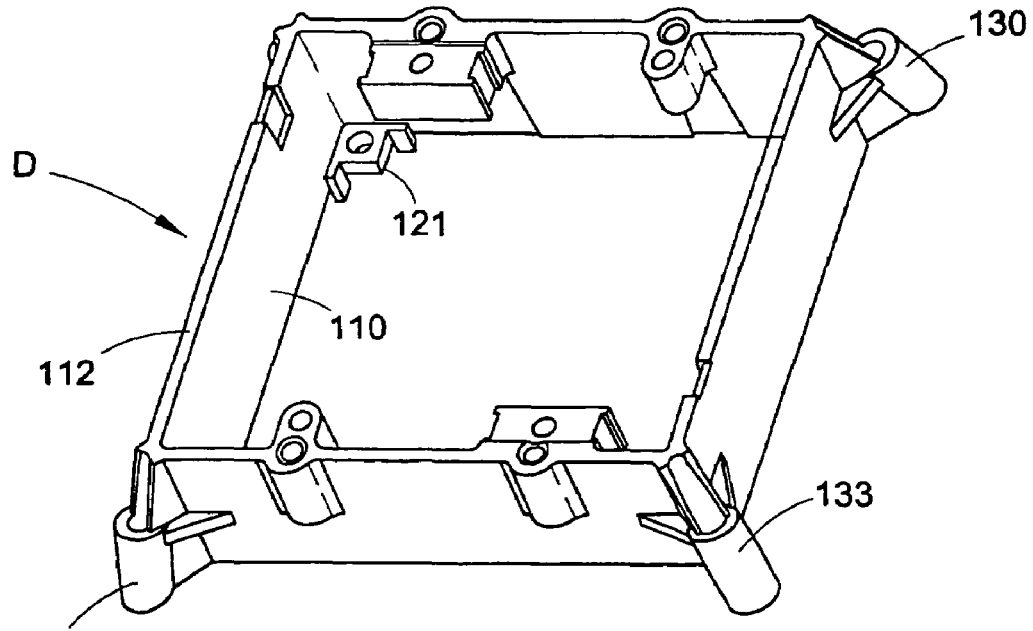
FIG. 19 is another perspective illustration of the two gang adapter.
Figure 20:
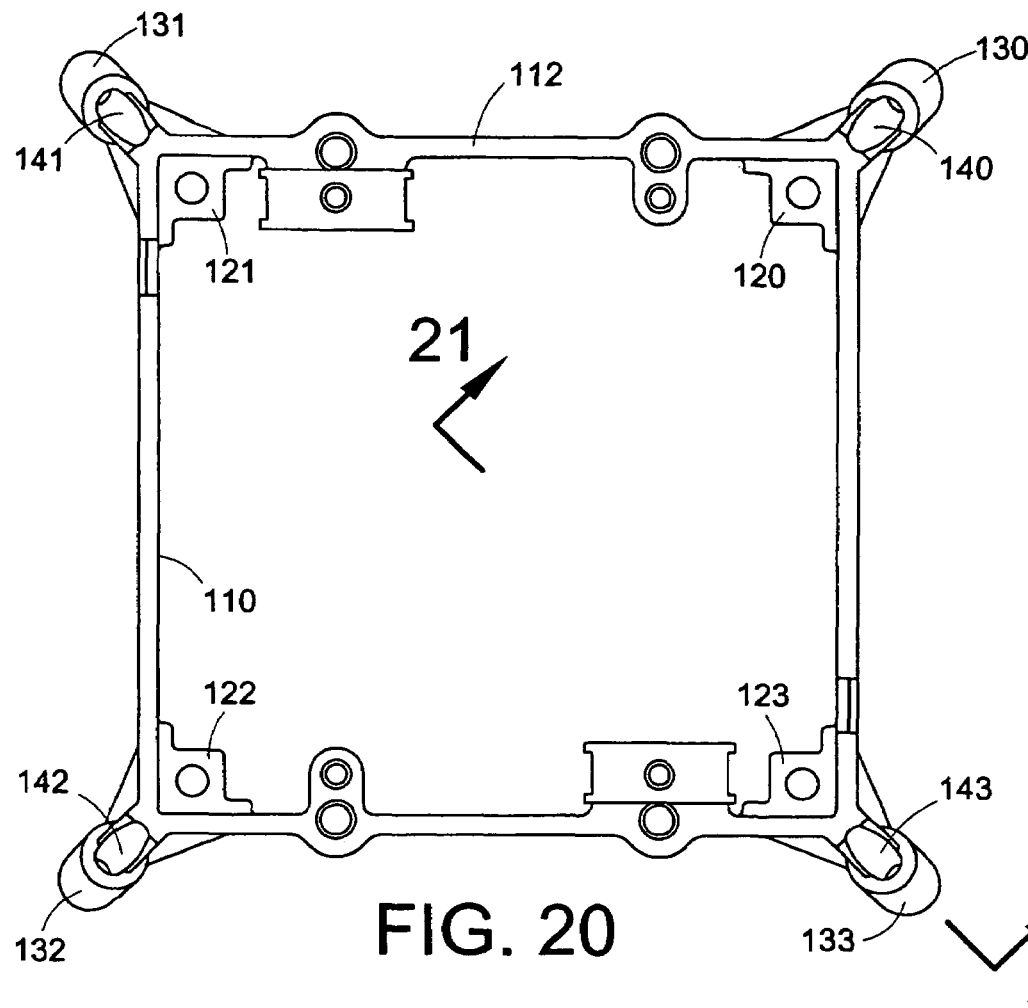
FIG. 20 is a front view thereof.
Figure 21:
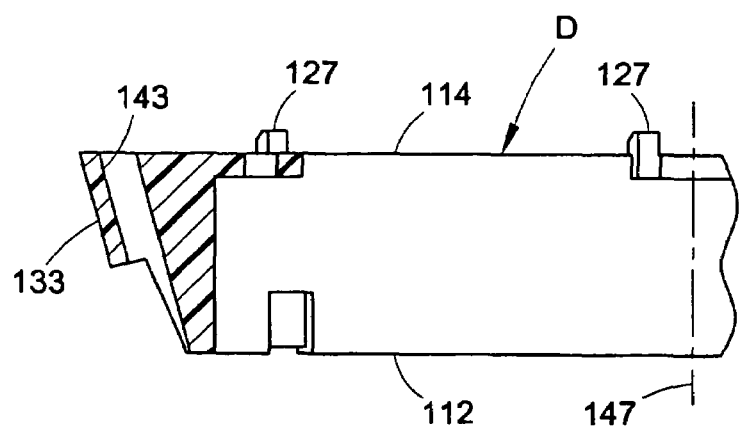
FIG. 21 is a partial and inverted cross-sectional elevational view taken generally on line 21—21 of FIG. 20.
Figure 22:
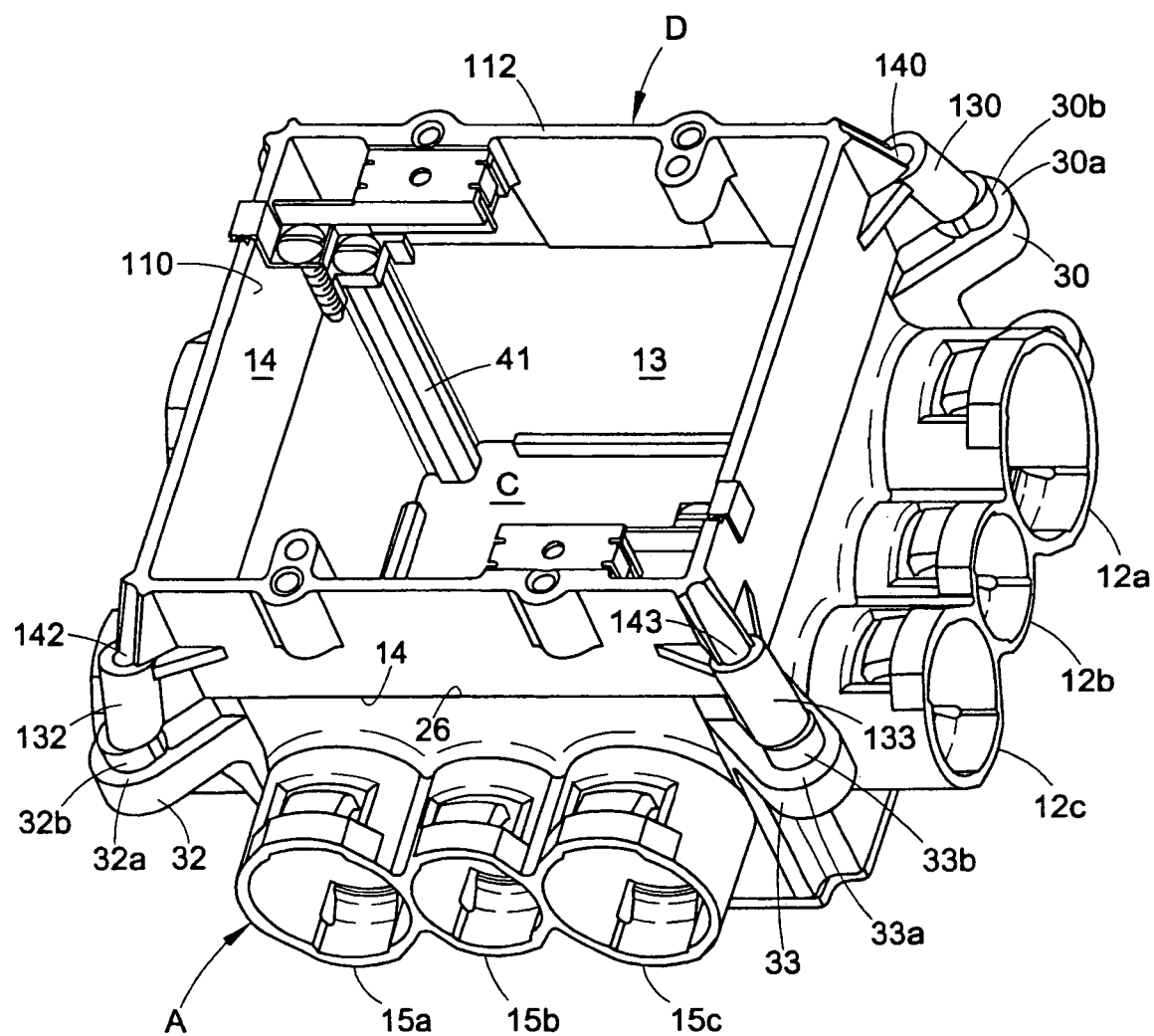
FIG. 22 is a perspective illustration of the two gang of FIGS. 18–21 installed on the box of FIGS. 1–8.
Figure 23:
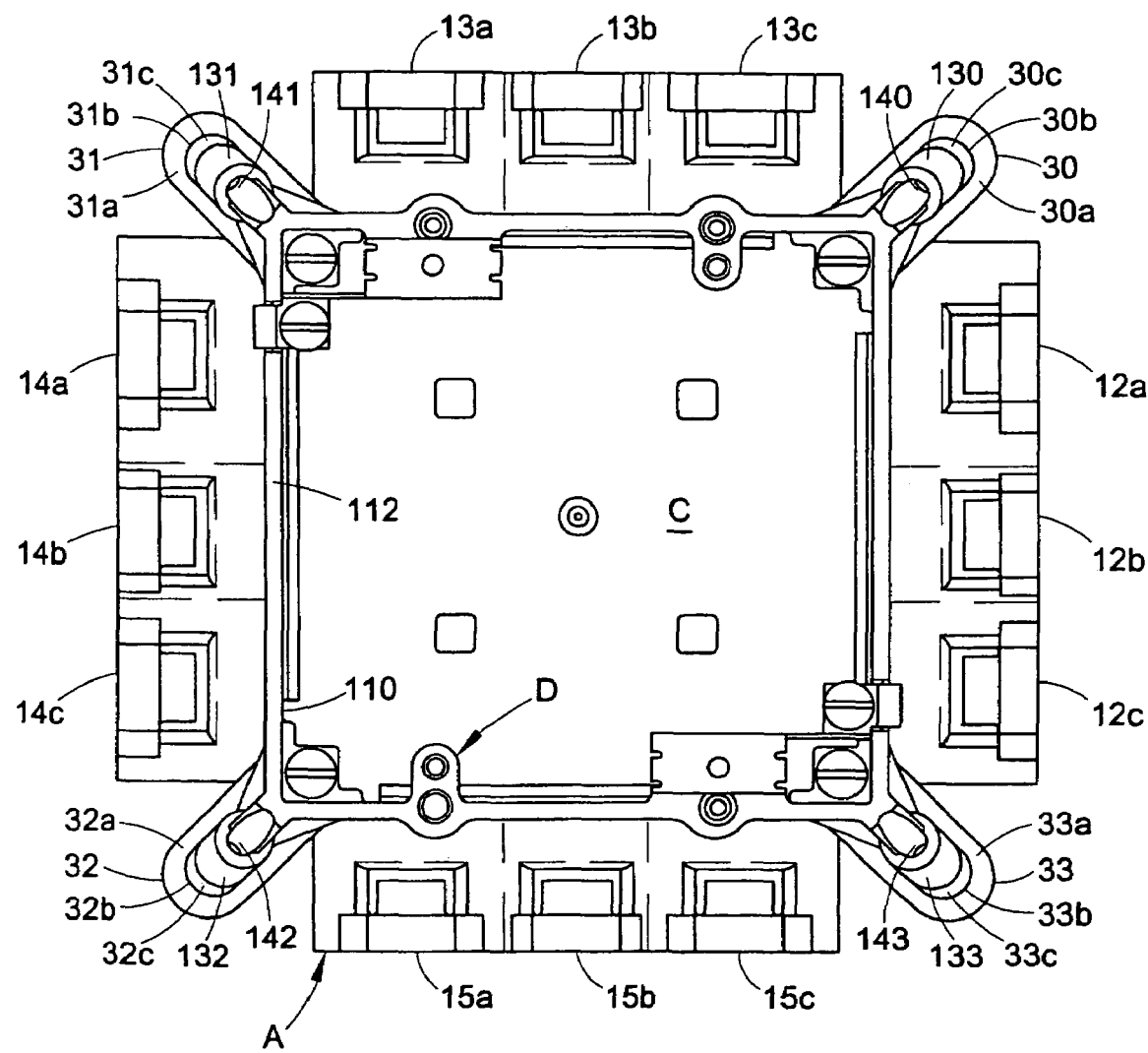
FIG. 23 is a front view thereof.
Figure 24:
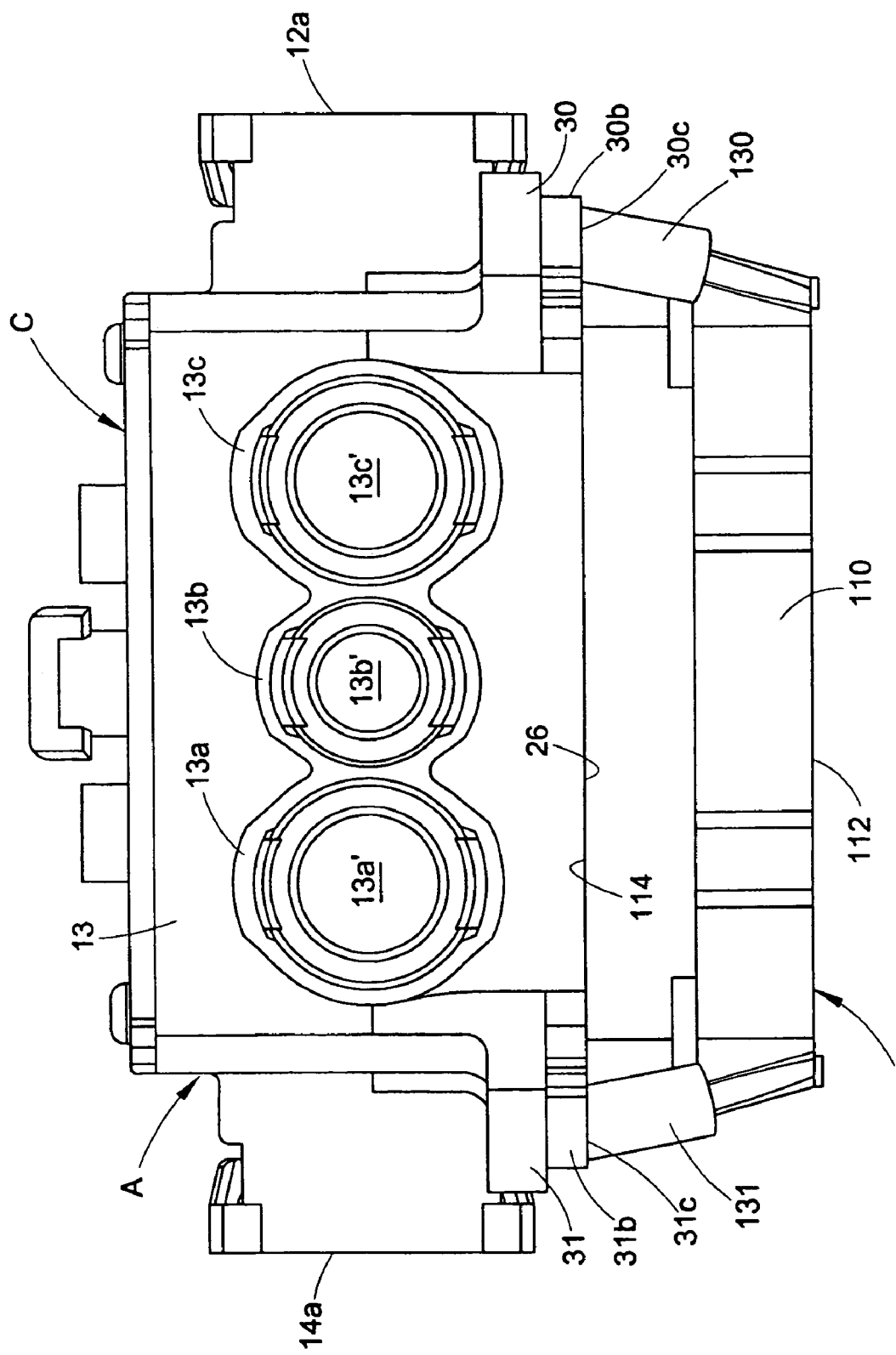
FIG. 24 is a side elevational view thereof.
Figure 25:
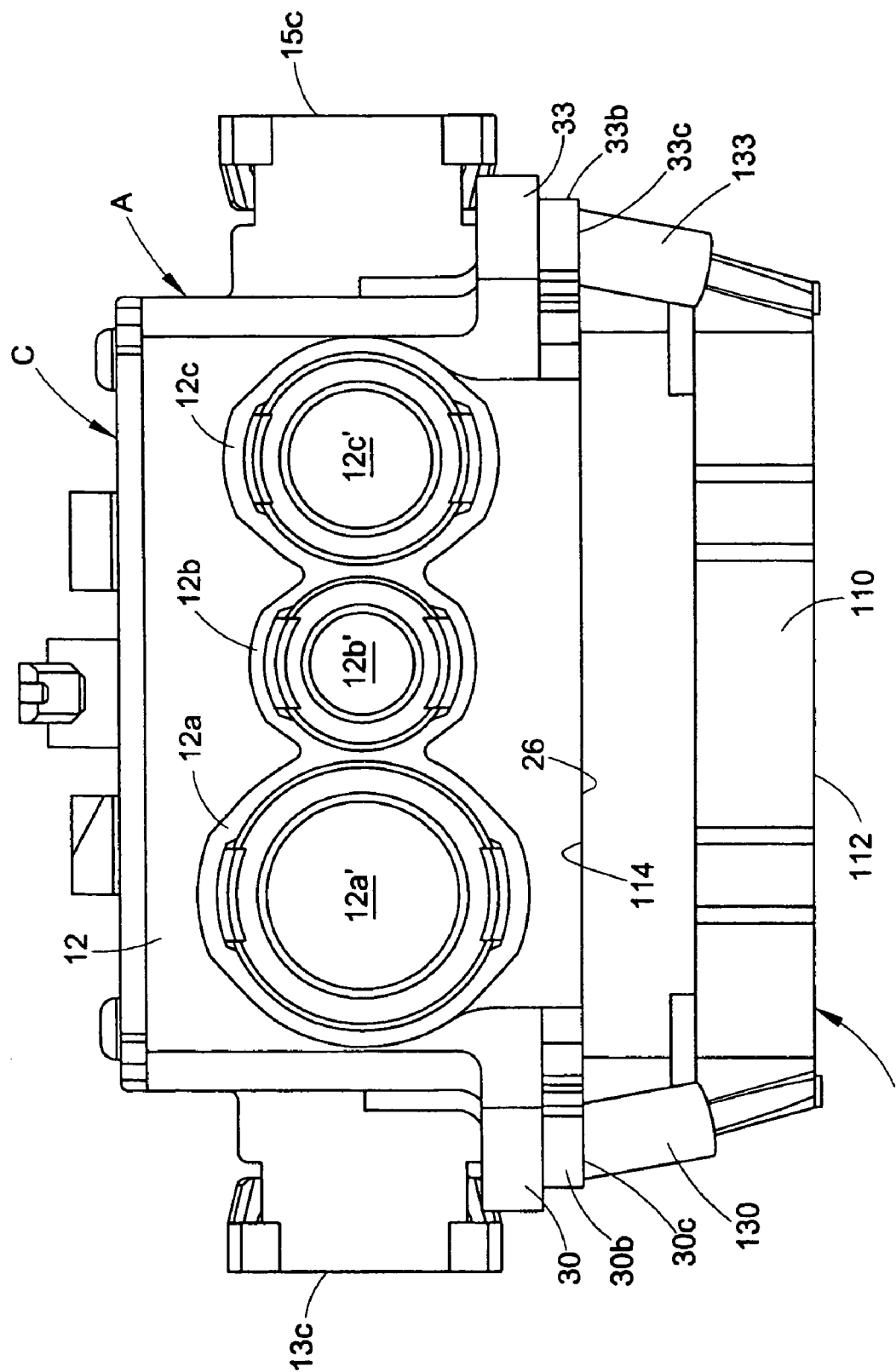
FIG. 25 is a side elevational view of another side thereof.

As shown in FIG. 13, ceiling adapter attachment ears 81, 83 have front surfaces 81a, 83a that are spaced from adapter front surface 72. Adapter attachment ears 81-83 preferably are dimensioned such that the distance between the rear surfaces of the attachment ears that lie in a common plane with adapter rear surface 74 to attachment ear front surfaces 81a, 83a is not greater than two-thirds of the distance between adapter front and rear surfaces 72, 74.

Rear surface 74 of adapter B has a plurality of spaced-apart alignment projections 107 that lie on the periphery of a square. Preferably, there are at least two alignment projections for each side of the square, and they are located adjacent, but spaced from, the corners of the square. The alignment projections are positioned on the periphery of a square such that the outside surfaces of the alignment projections are closely receivable within the inside surfaces of sidewalls 12–15 of box A when adapter rear surface 74 is in engagement with box front surface 26. This facilitates alignment of the attachment ears and fastener receiving holes on the box and adapter. The intersections of the outside surfaces of the alignment projections with the ends thereof are sloped inwardly toward the inside of the adapter as generally indicated at 107a to provide cam surfaces that facilitate entry of the alignment projections within the square inside periphery of the box sidewalls.

FIGS. 14–17 show ceiling adapter B attached to box A with adapter rear surface 74 engaging box front surface 26. The box in FIGS. 14–17 has a generally square cover C attached to rear surface 28 of box A with screws that extend into the fastener receiving holes in box internal bosses 40–43.

FIGS. 18–21 show a two gang adapter D having a square peripheral wall 110 with front and rear surfaces 112, 114. Adapter D is dimensioned so that rear surface 114 thereof mates with box front surface 26. Internal flanges 120, 121, 122 and 123 adjacent adapter rear surface 114 have suitable fastener receiving holes therethrough that are alignable with the fastener receiving holes in bosses 40–43 of box A. Fasteners are extended through the aligned holes for attaching adapter D to the front surface of box A.

Adapter attachment ears 130–133 extend outwardly from the corners of adapter D along diagonal lines that extend across diagonally opposite corners of adapter D. Attachment ears 130–133 have inclined fastener receiving holes 140, 141, 142 and 143 therethrough. The entrance openings to fastener receiving holes 140–143 at adapter rear surface 114 are alignable with the exit ends of holes 50–53 in attachment ears 30–33 on box A. Holes 140–143 are inclined to the plane of adapter front surface 112 at angles at around 75°. The holes also are inclined so that the center lines of the holes intersect adapter longitudinal axis 147.

A plurality of spaced-apart alignment projections 127 that lie on the periphery of a square extend outwardly of rear surface 114. Preferably, there are at least two alignment projections for each side of the square, and they are located adjacent, but spaced from, the corners of the square such that the outside surfaces of the alignment projections are closely receivable within the inside surfaces of sidewalls 12–15 of box A when adapter rear surface 114 is in engagement with box front surface 26. This facilitates alignment of the attachment ears and fastener receiving holes on the box and adapter. The intersections of the outside surfaces of the alignment projections with the ends thereof are sloped inwardly toward the inside of the adapter as described with reference to alignment projections 107 and cam surfaces 107a on adapter B to facilitate entry of the alignment projections within the square inside periphery of the box sidewalls.

FIGS. 22–25 show adapter D attached to box A.

Figure 26:
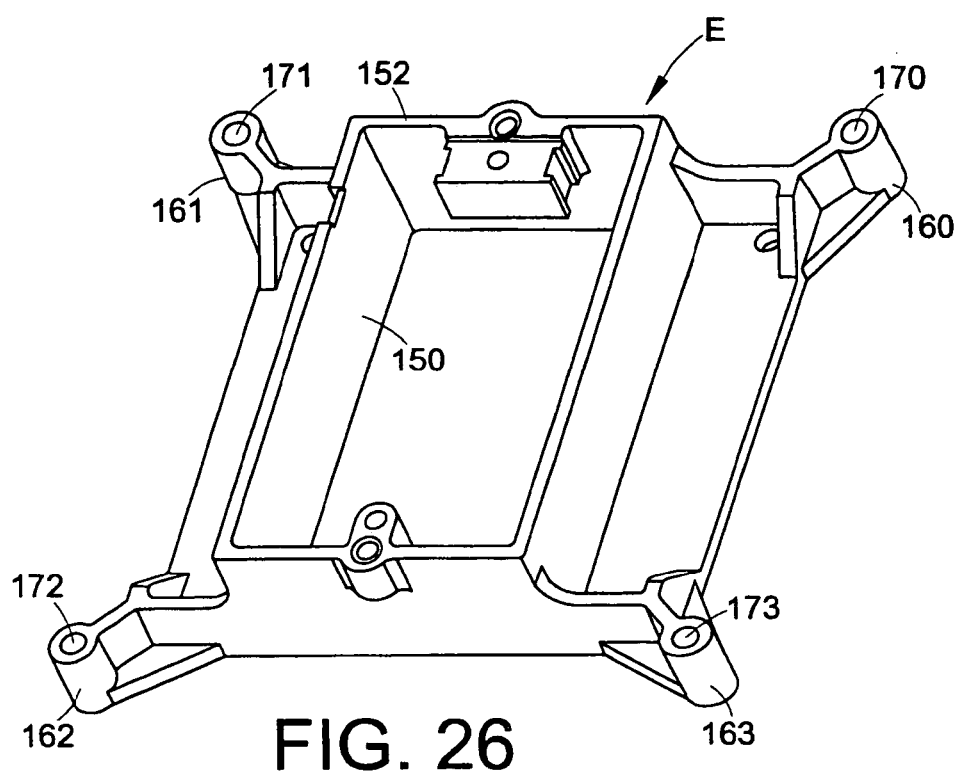
FIG. 26 is a perspective illustration of a single gang adapter.
Figure 27:
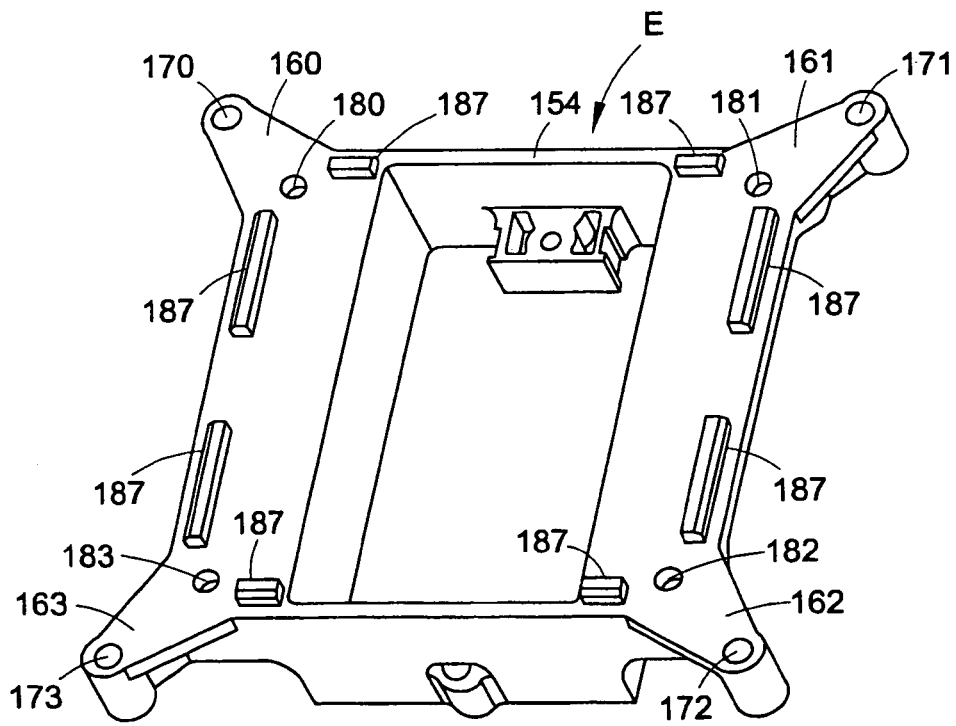
FIG. 27 is another perspective illustration of the single gang adapter.
Figure 28:
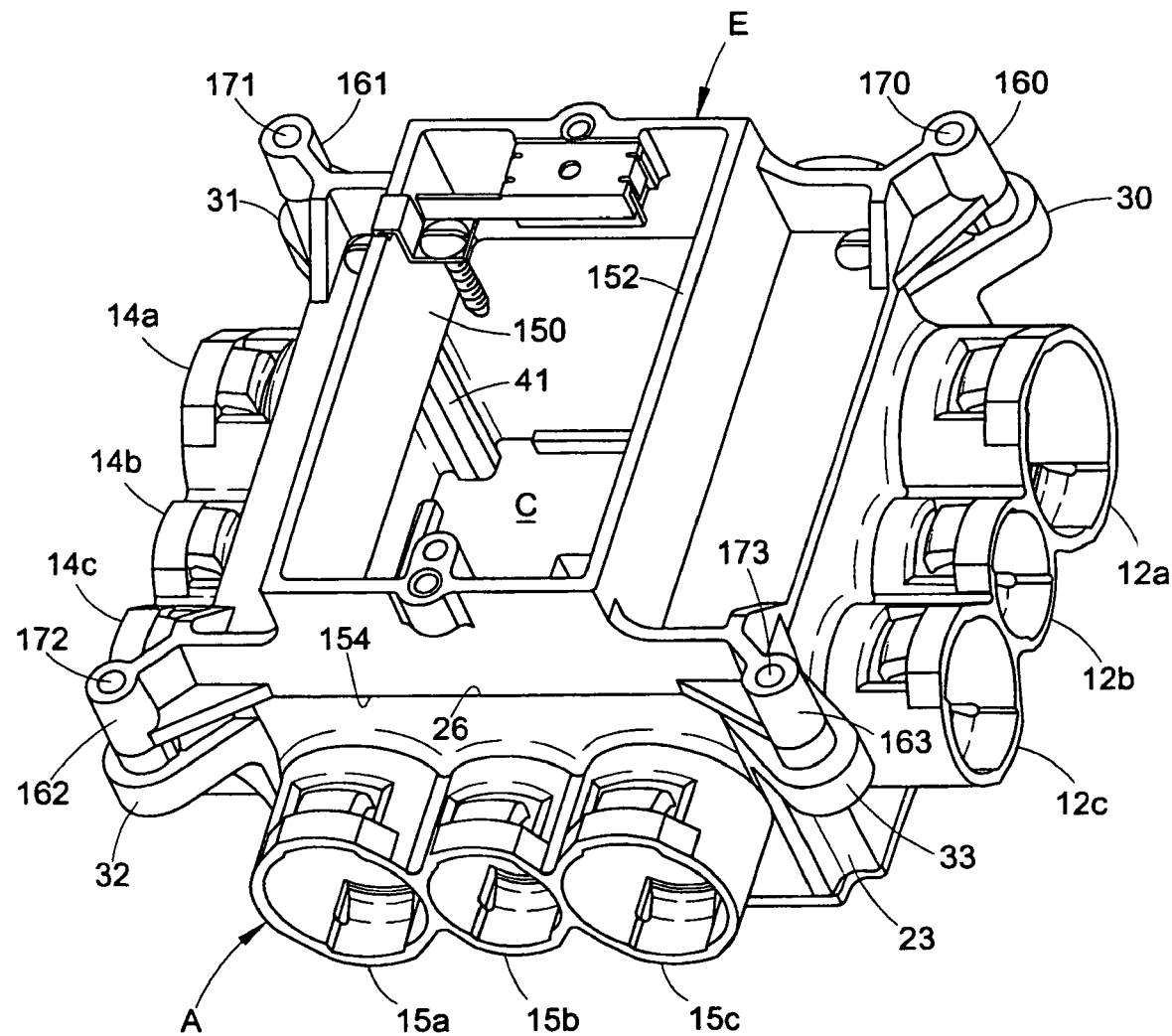
FIG. 28 is a perspective illustration of the single gang adapter of FIGS. 26 and 27 installed on the mud box of FIGS. 1–8.
Figure 29:
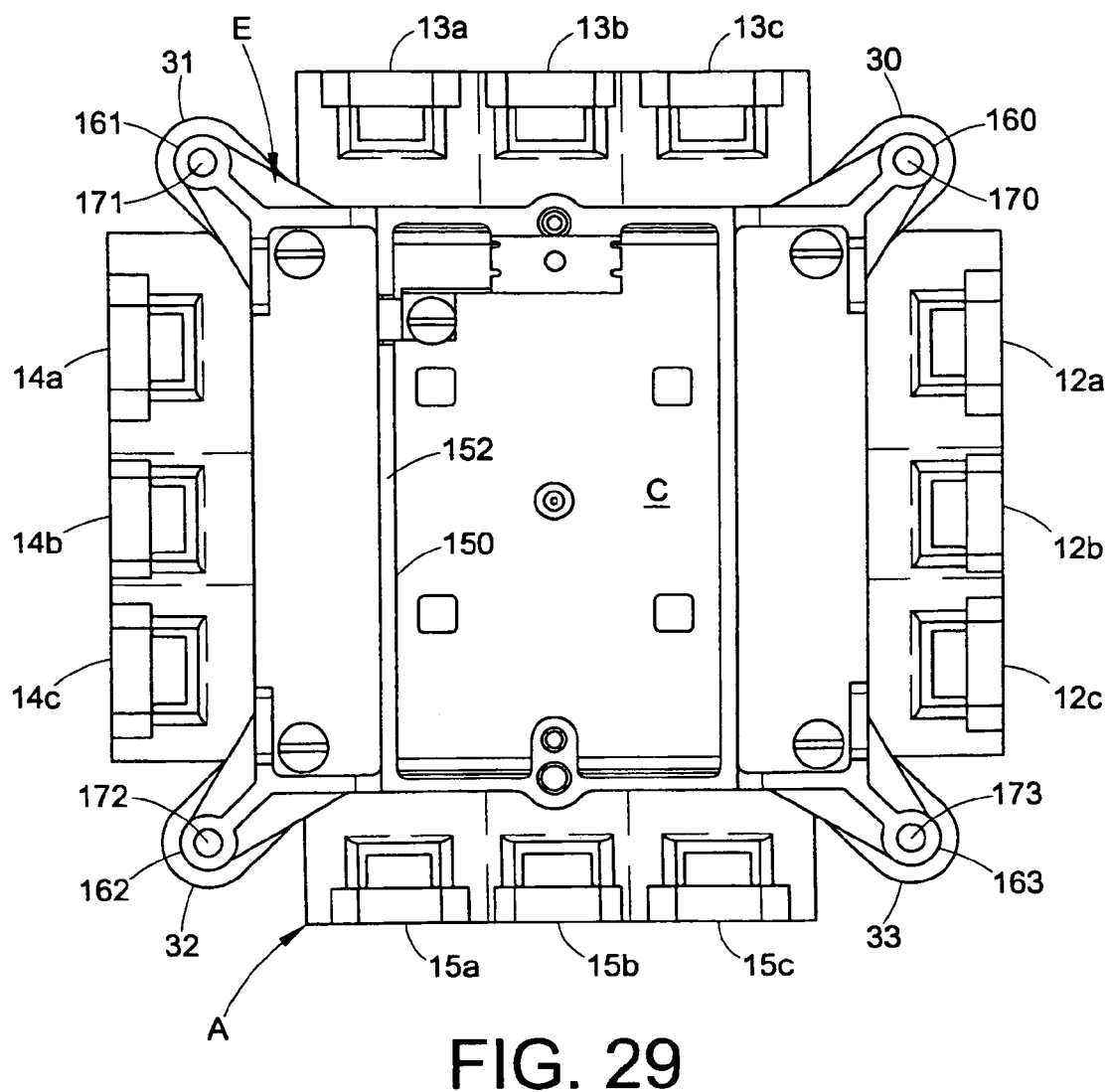
FIG. 29 is a front view thereof.
Figure 30:
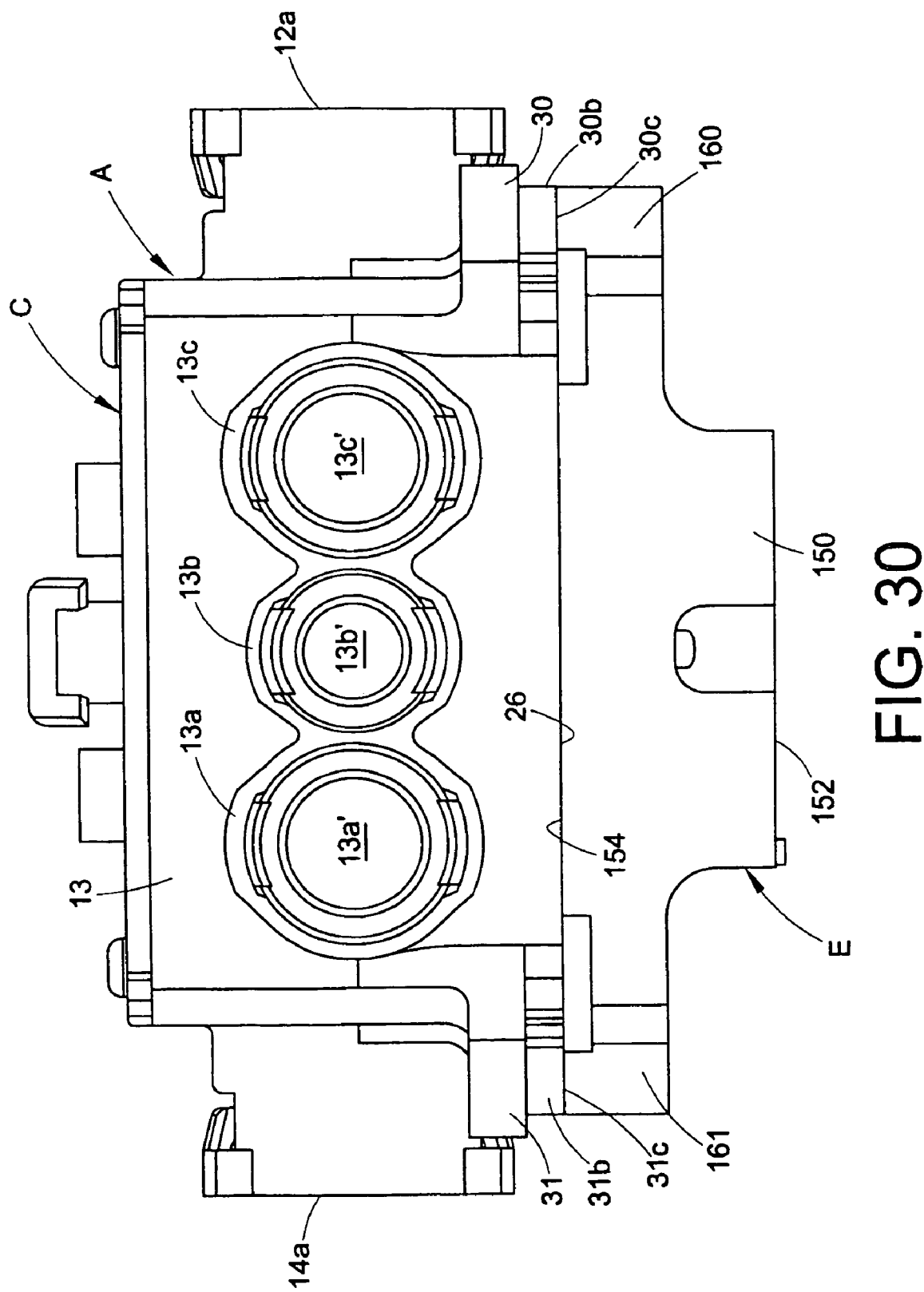
FIG. 30 is a side elevational view thereof, the opposite side being a mirror image thereof.
Figure 31:
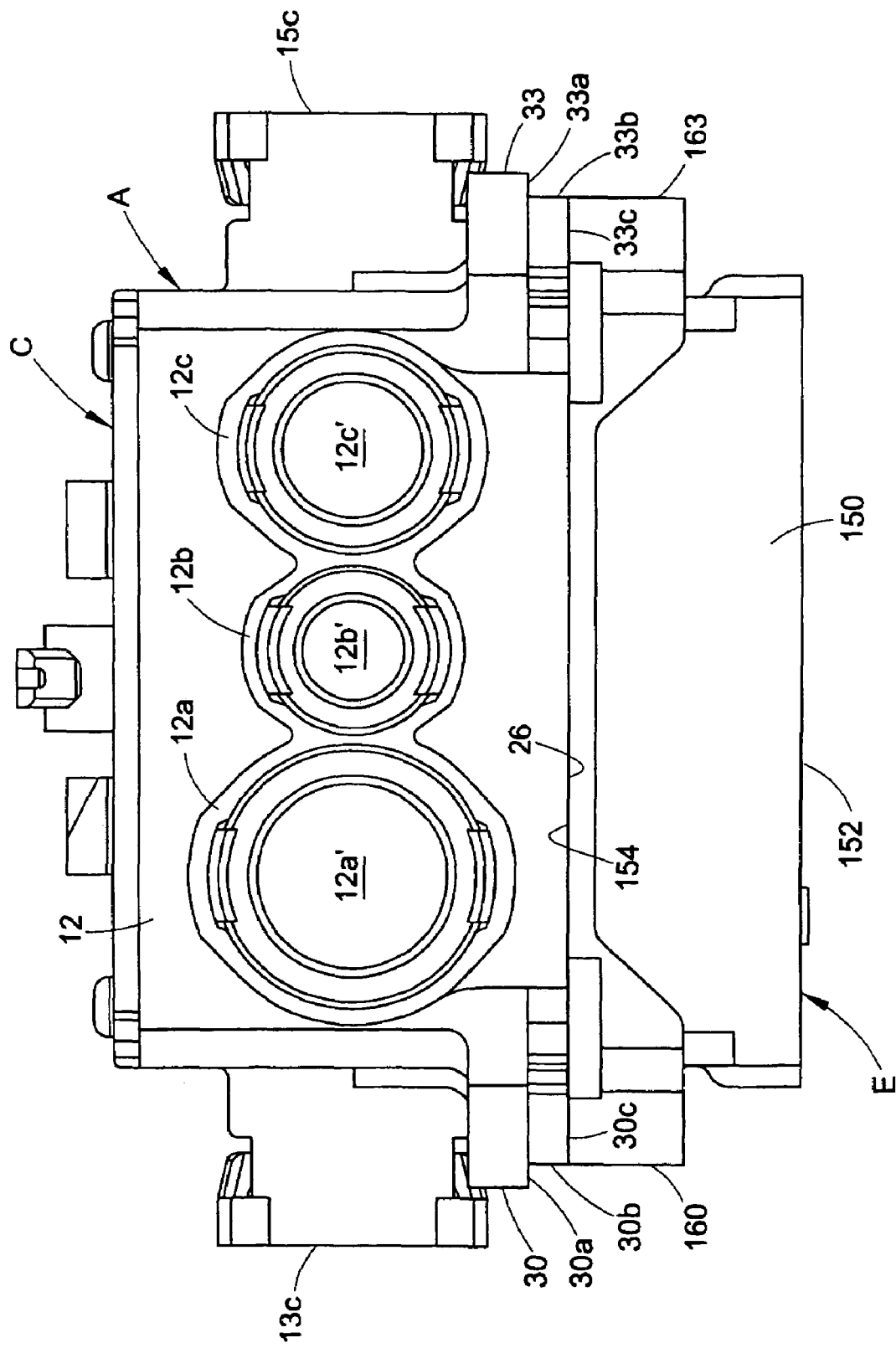
FIG. 31 is a side elevational view of another side thereof, the opposite side being a mirror image thereof.

FIGS. 26 and 27 show a single gang adapter E having a rectangular peripheral wall 150. Attachment ears 160, 161, 162 and 163 extend outwardly along diagonal lines that extend across diagonally opposite corners of a square. Adapter attachment ears 160–163 have fastener receiving holes 170, 171, 172 and 173 therethrough alignable with the exit ends of fastener receiving holes 50–53 in attachment ears 30–33 of box A.

Fastener receiving holes 170–173 extend parallel to the central longitudinal axis of adapter E so that fasteners received therethrough are not inclined. Fastener receiving holes 180, 181, 182 and 183 in adapter E are alignable with the fastener receiving holes in box bosses 40–43 for attaching adapter E to box A with adapter rear surface 154 engaging box front surface 26. The front end surfaces of attachment ears 160–163 are spaced rearwardly from adapter front surface 152 in the same manner as the spacing of front surfaces 80a–83a on ears 80–83 of adapter B in FIGS. 9–13.

A plurality of spaced-apart alignment projections 187 that lie on the periphery of a square extend outwardly from rear surface 154. Preferably, there are at least two alignment projections for each side of the square, and they are located adjacent, but spaced from, the corners of the square. The alignment projections are positioned on the periphery of a square such that the outside surfaces of the alignment projections are closely receivable within the inside surfaces of sidewalls 12–15 of box A when adapter rear surface 154 is in engagement with box front surface 26. This facilitates alignment of the attachment ears and fastener receiving holes on the box and adapter.

The intersections of the outside surfaces of the alignment projections with the ends thereof are sloped inwardly toward the inside of the adapter as described with reference to alignment projections 107 and cam surfaces 107a on adapter B to facilitate entry of the alignment projections within the square inside periphery of the box sidewalls. FIGS. 28–31 show adapter E attached to box A.

Two opposite sidewalls of adapter D have bosses with fastener receiving holes that open outwardly at front surface 112 for attaching a pair of receptacles, a pair of switches or one receptacle and one switch to the adapter. Another adapter that is not shown and is similar to adapter D is a four gang adapter that commonly is used for mounting smoke alarms or other types of devices. Adapter E also has bosses with fastener receiving holes that open outwardly at front surface 152 for attaching a switch or receptacle to the adapter.

Although the claimed subject matter has been shown and described with reference to representative embodiments, it is obvious that alterations and modifications will occur to others skilled in the art upon the reading and understanding of this application. Therefore, it is to be understood that the subject matter of the application may be practiced otherwise than as specifically described herein while remaining within the scope of the claims.

We claim:

1. A generally square electrical box molded of plastic material, said box having four sidewalls that intersect at corners, a box front surface, a box rear surface and a box central longitudinal axis, box attachment ears extending outwardly from said corners along diagonal lines that extend diagonally across diagonally opposite ones of said corners adjacent said box front surface, an adapter attached to said box front surface, said adapter having adapter attachment ears aligned with said box attachment ears, aligned fastener receiving holes through said box attachment ears and said adapter attachment ears in a direction between said box front and rear surfaces, and said fastener receiving holes being configured to receive fasteners that are inclined inwardly toward said box longitudinal axis.

2. The box of claim 1 wherein said fastener receiving holes in said box attachment ears have entrance and exit openings that are oblong along said diagonal lines, and fastener receiving holes in said adapter attachment ears are cylindrical.

3. The box of claim 1 wherein said box attachment ears are spaced from said box front surface and have end portions with ear extensions that engage said adapter attachment ears.

4. The box of claim 1 wherein said adapter has adapter front and rear surfaces and said adapter attachment ears extend from said adapter rear surface toward said adapter front surface a distance that is less than two thirds of the distance between said adapter front and rear surfaces.

5. The box of claim 1 wherein said adapter has an adapter rear surface engaging said box front surface and further including adapter alignment projections extending from said adapter rear surface for close reception within said box sidewalls.

6. The box of claim 1 wherein said fastener receiving holes in said adapter attachment ears are generally cylindrical and have hole axes inclined inwardly toward said box longitudinal axis.

7. The box of claim 1 including aligned fastener receiving assembly passages in said box and adapter for receiving fasteners that secure said box and adapter in assembled relationship.

8. A generally square electrical box molded of plastic material, said box having four sidewalls that intersect at four corners, a box front surface, a box rear surface and a box central longitudinal axis, box attachment ears extending outwardly from all four of said corners along diagonal lines that extend diagonally across diagonally opposite ones of said corners adjacent said box front surface, all of said ears being located adjacent said box front surface, an adapter attached to said box front surface, said adapter having four adapter attachment ears aligned with said box attachment ears, aligned fastener receiving holes through said box attachment ears and said adapter attachment ears in a direction between said box front and rear surfaces, said fastener receiving holes being configured to receive fasteners that are inclined inwardly toward said box longitudinal axis for attaching said box and adapter to a support surface against which said adapter front surface is engaged, said adapter front surface lying in an adapter front surface plane, and said fastener receiving holes having hole axes that intersect said adapter front surface plane outwardly of said adapter front surface.

9. The box of claim 8 wherein said fastener receiving holes in said box attachment ears have non-circular entrance and exit openings that are oblong along said diagonal lines, and said fastener receiving holes in said adapter attachment ears are cylindrical.

10. The box of claim 8 wherein said box attachment ears are spaced in a direction toward said box rear surface from said box front surface and have end portions with ear extensions that extend in a direction generally parallel to said box longitudinal axis toward said box front surface and engage said adapter attachment ears.

11. The box of claim 8 wherein said adapter has adapter front and rear surfaces and said adapter rear surface engages said box front surface, and said adapter attachment ears extend from said adapter rear surface toward said adapter front surface a distance that is less than two thirds of the distance between said adapter front and rear surfaces.

12. The box of claim 8 wherein said adapter has an adapter rear surface engaging said box front surface and further including adapter alignment projections extending from said adapter rear surface for close reception within said box sidewalls.

13. The box of claim 8 including aligned fastener receiving assembly passages in said box and adapter for receiving fasteners that secure said box and adapter together in assembled relationship.

14. The box of claim 13 wherein said fastener receiving box assembly passages are adjacent said box corners and said fastener receiving adapter assembly passages are aligned with said adapter attachment ears and spaced inwardly from said fastener receiving holes in said adapter attachment ears.

15. The box of claim 8 wherein said box sidewalls have an outer peripheral box sidewall surface and said adapter has an adapter outer periphery with an adapter outer peripheral surface, said outer peripheral box sidewall surface being spaced inwardly from a square that circumscribes said box attachment ears, and said adapter outer peripheral surface being spaced inwardly from a square that circumscribes said adapter attachment ears.

* * * * *